(12) United States Patent
Irwin et al.

(10) Patent No.: US 9,319,535 B2
(45) Date of Patent: Apr. 19, 2016

(54) METHOD AND APPARATUS TO COLLECT, ANALYZE, AND UTILIZE NETWORK DATA

(71) Applicant: Syniverse Technologies, LLC, Tampa, FL (US)

(72) Inventors: Scott Andrew Irwin, Apopka, FL (US); John Greer Moore, Lake Mary, FL (US); Robert Wayne Boucher, Dade City, FL (US); Michael J. Dimperio, Longwood, FL (US); Maria F. Vaughan, Sanford, FL (US); Paolo Teotino, Rome (IT)

(*) Notice: Subject to any disclaimer, the term of this patent is extended or adjusted under 35 U.S.C. 154(b) by 0 days.

(21) Appl. No.: 13/927,024

(22) Filed: Jun. 25, 2013

(65) Prior Publication Data
US 2014/0378091 A1  Dec. 25, 2014

(51) Int. Cl.
H04M 15/00  (2006.01)

(52) U.S. Cl.
CPC .............. *H04M 15/59* (2013.01); *H04M 15/49* (2013.01); *H04M 15/58* (2013.01); *H04M 15/8038* (2013.01); *H04M 15/60* (2013.01)

(58) Field of Classification Search
CPC ..... H04M 15/58; H04M 15/49; H04M 15/59; H04M 15/60
USPC ........................................................ 455/405
See application file for complete search history.

(56) References Cited

U.S. PATENT DOCUMENTS

| | | | |
|---|---|---|---|
| 8,116,731 B2 | 2/2012 | Buhrmann et al. | |
| 8,280,348 B2 | 10/2012 | Snyder et al. | |
| 8,315,610 B2 | 11/2012 | Hasemann | |
| 8,374,634 B2 | 2/2013 | Dankar et al. | |
| 8,559,944 B2 | 10/2013 | Ophir et al. | |

(Continued)

FOREIGN PATENT DOCUMENTS

| KR | 20090059404 A | 6/2009 |
|---|---|---|
| KR | 20090063122 A | 6/2009 |

(Continued)

OTHER PUBLICATIONS

"Amdocs Showcases Full Range of Solutions and Services to Help Service Providers Unlock the Value of Big Data Analytics," <www.prnewswire.com/news-releases/amdocs-showcases-full-range-of-solutions-and-services-to-help-service-providers-unlock-the-value-of-big-data-analytics-212287161.html>, Accessed Jul. 15, 2013.

(Continued)

*Primary Examiner* — Jinsong Hu
*Assistant Examiner* — Jean Chang
(74) *Attorney, Agent, or Firm* — HIPLegal LLP; Judith A. Szepesi

(57) ABSTRACT

A method of providing enhanced mobile communications services through collecting, analyzing, and utilizing cellular network data is described. The method configures an intelligence engine based on a set of rules. The method receives the set of rules through a user interface or generates the set of rules through performing an analysis on the network data by the intelligence engine. The method receives network data events and correlates the received network data events. The intelligence engine determines an action in response to a correlated network data event. The action includes sending a text message or email containing an offer to a mobile communications services subscriber, or updating a database. The method then performs the action.

21 Claims, 19 Drawing Sheets

(56) References Cited

U.S. PATENT DOCUMENTS

| | | |
|---|---|---|
| 2002/0090943 A1 | 7/2002 | Kwon |
| 2006/0205434 A1 | 9/2006 | Tom et al. |
| 2007/0202848 A1 | 8/2007 | Ishikawa et al. |
| 2009/0204815 A1 | 8/2009 | Dennis et al. |
| 2010/0035636 A1 | 2/2010 | Enzmann et al. |
| 2010/0085947 A1 | 4/2010 | Ringland et al. |
| 2010/0100519 A1* | 4/2010 | Aaron et al. .................. 706/47 |
| 2010/0273504 A1 | 10/2010 | Bull et al. |
| 2010/0281388 A1 | 11/2010 | Kane et al. |
| 2011/0009132 A1 | 1/2011 | Skarby et al. |
| 2011/0154447 A1 | 6/2011 | Dennis et al. |
| 2011/0202407 A1 | 8/2011 | Buhrmann et al. |
| 2011/0208601 A1 | 8/2011 | Ferguson et al. |
| 2012/0130898 A1 | 5/2012 | Snyder et al. |
| 2012/0131121 A1 | 5/2012 | Snyder et al. |
| 2012/0144498 A1 | 6/2012 | Buhrmann et al. |
| 2012/0149387 A1 | 6/2012 | Rawat et al. |
| 2012/0196568 A1 | 8/2012 | Bakshi |
| 2012/0253957 A1 | 10/2012 | Bakshi |
| 2012/0302209 A1 | 11/2012 | Snyder et al. |
| 2013/0030934 A1 | 1/2013 | Bakshi et al. |
| 2013/0046626 A1 | 2/2013 | Grigg et al. |
| 2013/0054367 A1 | 2/2013 | Grigg et al. |
| 2013/0117155 A1 | 5/2013 | Glasgo |
| 2013/0132568 A1 | 5/2013 | Dankar et al. |
| 2013/0182554 A1* | 7/2013 | Poon et al. .................. 370/216 |
| 2013/0197998 A1 | 8/2013 | Buhrmann et al. |
| 2013/0262311 A1 | 10/2013 | Buhrmann et al. |
| 2013/0333032 A1* | 12/2013 | Delatorre et al. ............... 726/23 |

FOREIGN PATENT DOCUMENTS

| | | |
|---|---|---|
| KR | 20100053706 A | 5/2010 |
| KR | 20110100804 A | 9/2011 |
| WO | 2010088086 A1 | 8/2010 |
| WO | 2010088298 A1 | 8/2010 |
| WO | 2012009557 A2 | 1/2012 |

OTHER PUBLICATIONS

PCT/US2014/04280, International Search Report, Nov. 26, 2014, 12 pages.

PCT/US2014/042820, Written Opinion, Nov. 26, 2014, 4 pages.

* cited by examiner

METHOD AND APPARATUS TO COLLECT, ANALYZE, AND UTILIZE NETWORK DATA

FIELD

The present invention relates to network data, and more particularly to a method and apparatus to collect, analyze, and utilize cellular network data.

BACKGROUND

Wireless telecommunications systems have many players. The end-customer, or caller, makes a connection through their cellular provider, which connects the caller to the recipient. If the caller and recipient are not on the same network, one or more interoperation providers connect the caller and recipient. The connection between the caller and recipient may go through several mobile networks that are managed by different mobile network operators.

When a cellular service customer travels to a location that is different from the home location where the customer registered for cellular service, roaming service ensures that the mobile device of the customer is kept connected to the network, without losing the connection. Roaming gives a cellular customer the ability to automatically make and receive voice calls, send and receive messages, send or receive data, or access other services, including home data services, when travelling outside the geographical coverage area of the home network, by means of using a visited network. Roaming can be invoked by using a mobile device or just by using the subscriber identity of the customer in the visited network. An interoperation provider provides solutions to make it possible for disparate technologies and standards to interoperate, so that mobile network operators in the mobile industry can provide their customers with access to voice calls, messaging, data and other services as subscribers move across mobile networks around the world.

As a result of multiple-party participation in the mobile communications services, there is a huge amount of cellular network data spread across heterogeneous sources, e.g., different mobile network operators and interoperation providers. The collection and management of this data is extremely complex and difficult. That prevents mobile network operators from utilizing this data in real-time to enhance end-user experience and to improve operational efficiency.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

In one embodiment, the present invention is a real-time intelligence system and method that collects, analyzes, and utilizes cellular network data. The system of one embodiment provides real-time processes enabling a mobile network operator to enhance customer care, network monitoring, roaming management, sales, marketing, and/or finance. The system of one embodiment efficiently delivers the highest quality of service through proactive intelligence and automation. In one embodiment, the real-time intelligence system provides one or more of real-time comprehensive data processing and monitoring, real-time automatic alerting, rule-based recommendations through embedded analytics and intelligence, and rule-based proactive actions.

The method of one embodiment provides enhanced mobile communications services through collecting, analyzing, and utilizing cellular network data. In one embodiment, the method configures an intelligence engine based on a set of rules. In one embodiment, the method receives the set of rules through a user interface. In another embodiment, the method generates the set of rules through performing an analysis on the network data by the intelligence engine. The method of one embodiment receives a real-time data event. In one embodiment, the real-time data event is a mobile communications usage record (such as Diameter Application data or RADIUS application data). In another embodiment, the real-time data event is a request for information. In one embodiment, the intelligence engine determines an action in response to the received real-time data event. In one embodiment, the action is sending a text message or email containing an offer to a mobile subscriber. In another embodiment, the action is updating a database. The method of one embodiment then performs the action.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
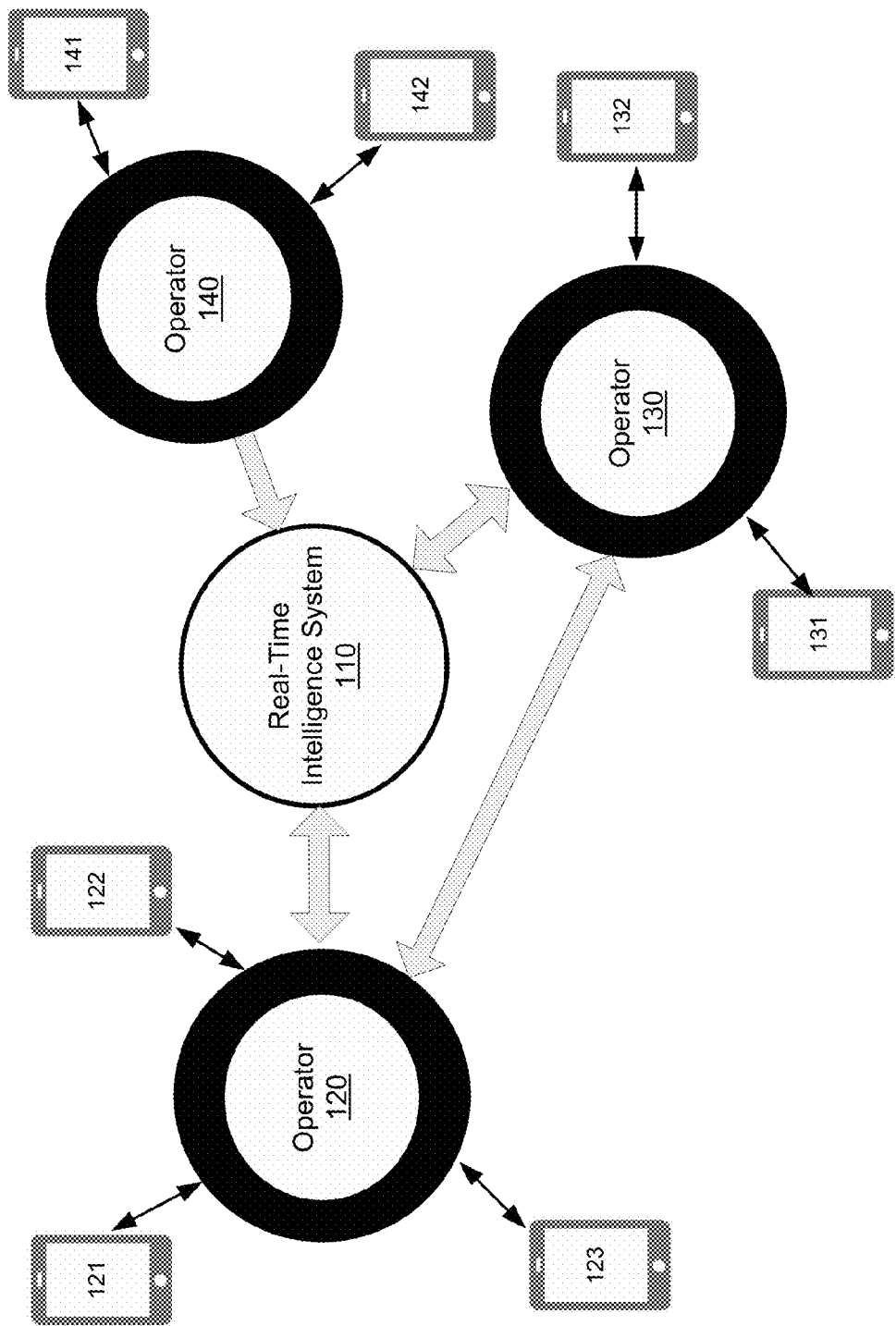
FIG. 1 a network diagram of one embodiment of utilizing a real-time intelligence system.

FIG. 1 is a network diagram of one embodiment of utilizing a real-time intelligence system. Specifically, real-time intelligence system 110 collects network data from multiple mobile network operators and provides information/intelligence to mobile network operators. The collected network data is network independent. For example, the collected network data can come from several different types of mobile networks, including, but not limited to, Global System for Mobile Communications (GSM), Code Division Multiple Access (CDMA), Third Generation Partnership Project (3GPP), 3GPP Long Term Evolution (LTE), and Enhanced Data rates for GSM Evolution (EDGE).

In one embodiment, the real-time intelligence system 110 collects data from and provides data to several mobile network operators represented by operators 120 and 130. In one embodiment, the real-time intelligence system 110 also collects data from other mobile network operators, represented by operator 140, without providing information/intelligence to these operators 140. Each of the mobile network operators 120, 130, and 140 serves multiple mobile devices represented by mobile devices 121-123, 131-132, and 141-142, respectively.

A mobile network operator (also known as a wireless service provider, wireless carrier, cellular company, or mobile network carrier) is a provider of wireless communications services that sells and delivers services to an end user. A mobile network operator provides wireless communications services to individual customers using mobile devices. For example, the mobile network operator 120 provides wireless communications services to customers using the mobile devices 121-123. Of course, while only a few mobile devices are shown for simplicity, a mobile carrier may provide services to millions of customers.

Some mobile network operators have roaming agreements with each other. Roaming agreements stipulate the legal aspects of allowing customers of one mobile network operator to use the network of another. For example, operator 120 has a roaming agreement with operator 130. Therefore, the customers of operators 120 and 130 can roam to the cellular network of each other without losing their cellular connectivity. To facilitate roaming, operators 120 and 130 exchange data with each other. This data includes real-time data enabling the roaming, and accounting data for tracking the costs of roaming for billing purposes.

The real-time intelligence system 110 collects network data from the mobile network operators 120, 130, and 140. In one embodiment, the network data collected from the mobile network operators include signaling data and data clearinghouse (DCH) data, e.g., phone register and home location register (HLR) registration information. The collected network data provides location information and past travel history information. The collected network data also provides historical usage behavior of a subscriber, e.g., services used by the subscriber, countries visited by the subscriber, mobile networks used by the subscriber, mobile devices used by the subscriber, etc.

The real-time intelligence system 110 analyzes the collected data and provides advanced, user-friendly, intelligent solutions to the operators 120 and 130. The intelligent solutions are the result of real-time analysis and complex intelligence/analytics. In one embodiment, the real-time intelligence system 110 is integrated into an interoperations system, which provides interoperation between various mobile network operators.

In one embodiment, the real-time intelligence system 110 provides a single platform for troubleshooting, trend analysis, and fraud prevention. In one embodiment, the real-time intelligence system 110 also provides rule-based alerting with automatic resolution. In one embodiment, the mobile network operators 120 and 130 can use the real-time intelligence system 110 to enhance end-user experience and provide proactive customer care and service. The mobile network operators 120 and 130 can, in one embodiment, also use the real-time intelligence system 110 to improve operational efficiency, thus improving margins and maximizing profitability. In one embodiment, the real-time intelligence system 110 is a stand-alone system, while in another embodiment the real-time intelligence system 110 is part of a system for managing business operations and customer relations. In one embodiment, the real-time intelligence system 110 is integrated into an interoperations system, which enables roaming and the associated accounting.

Figure 2:
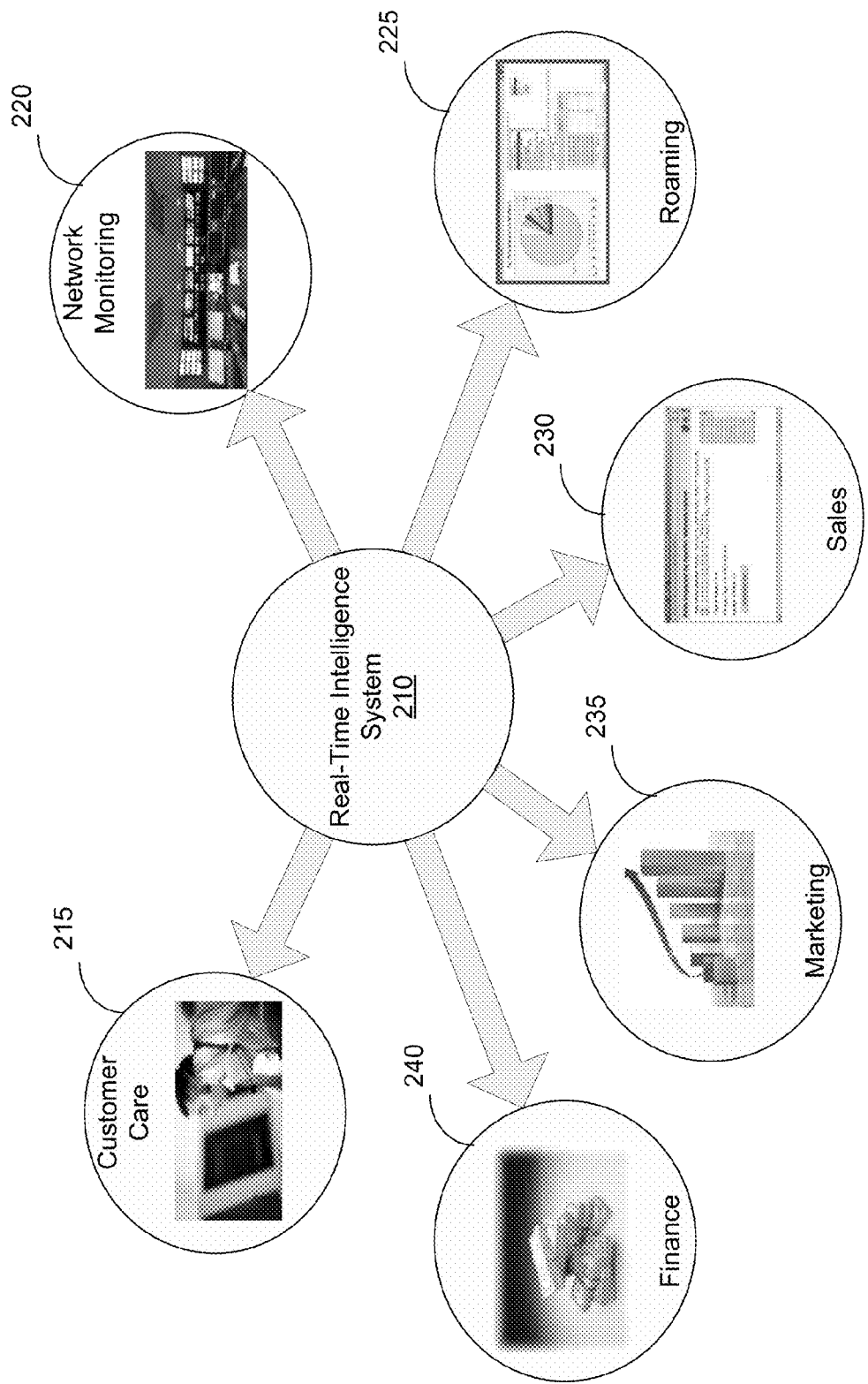
FIG. 2 is a functional overview of one embodiment of a real-time intelligence system.

FIG. 2 is a functional overview of one embodiment of a real-time intelligence system 210. In one embodiment, the real-time intelligence system 210 provides services for customer care 215, network monitoring 220, roaming 220, sales 230, marketing 235, and finance 240.

In one embodiment, the real-time intelligence system 210 enhances customer care 215 by performing proactive actions to detect service issues in real-time and resolve the issues before customers are impacted by the issues. In one embodiment, the real-time intelligence system 210 detects service issues and alerts customers about potential service interruptions.

Because the real-time intelligence system 210 collects network data from various sources, the real-time intelligence system 210 of one embodiment is able to enhance network monitoring 220 by performing analysis on the collected network data to detect any abnormal behaviors of mobile networks in real-time, and adopting necessary resolutions to improve key performance indicators (KPI) of the mobile network. In one embodiment, the real-time intelligence system 210 is able to predict certain network behavior based on an analysis of historical data so that the mobile network operator can make adjustments to accommodate the predicted network behavior.

In one embodiment, the real-time intelligence system 210 supports roaming 225 through proactive roaming data analysis. In one embodiment, the real-time intelligence system 210 performs real-time roaming management. In one embodiment, the real-time intelligence system 210 generates real-time alerts based on the analysis of roaming data. For example, the real-time intelligence system 210 monitors usage and generates an alert to the subscriber when overuse is detected in order to prevent subscriber bill shock.

The real-time intelligence system 210 of one embodiment increases sales 230 and improves targeted marketing 235 for a mobile network operator by analyzing roaming data to detect silent roaming subscribers and contact the subscriber with an offer to trigger usage. A silent roaming subscriber is a subscriber who is outside his or her mobile network operator's network, but not using his or her mobile phone, generally to reduce cost. The real-time intelligence system 210 can also improve the financial aspects 240 of the billing management for the mobile network operator.

Figure 3:
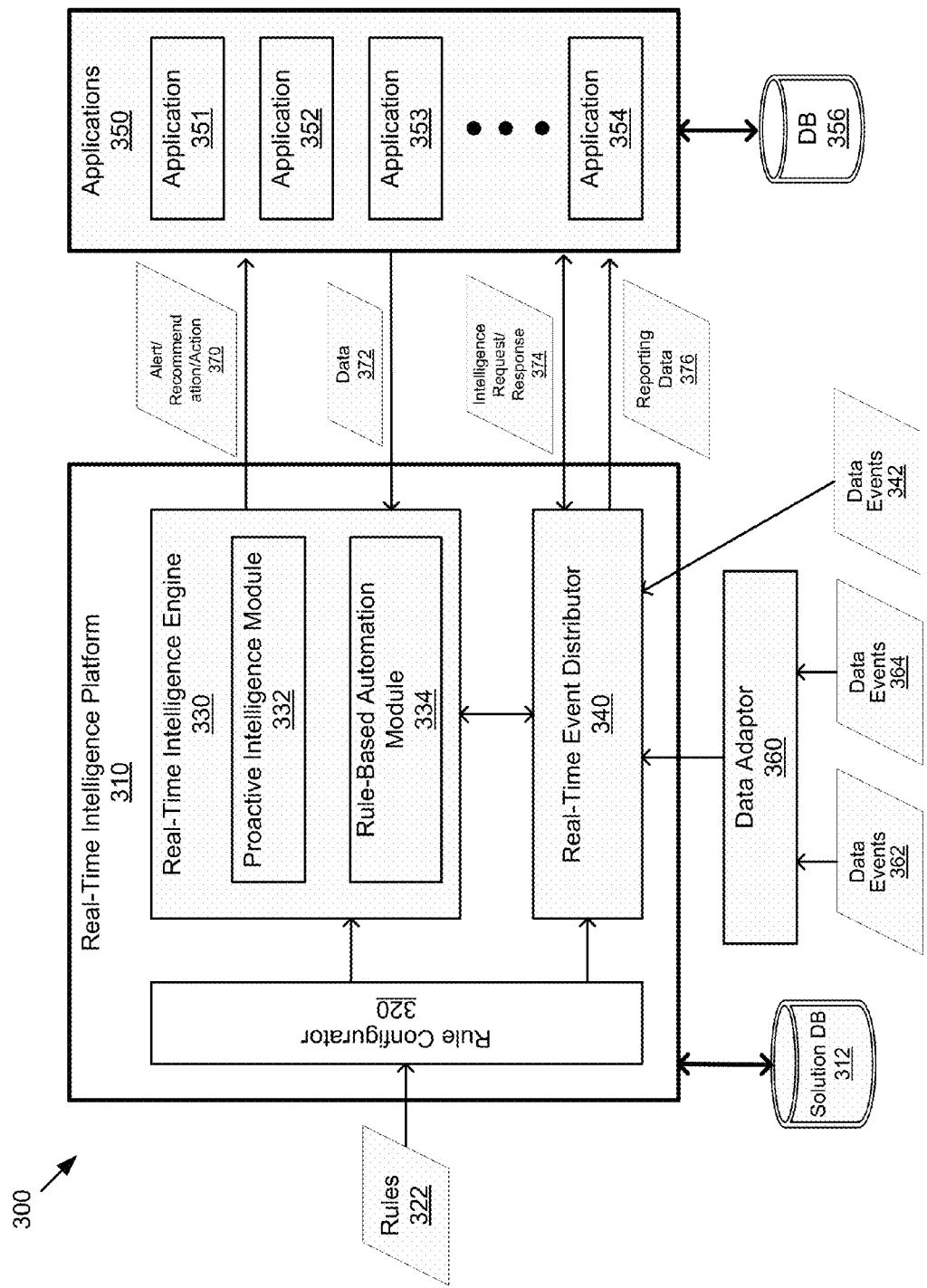
FIG. 3 is a block diagram of one embodiment of a real-time intelligent system.

FIG. 3 is a block diagram of one embodiment of a real-time intelligence system 300. Specifically, the figure illustrates an embodiment of the set of components of a single platform for providing advanced, user-friendly solutions for real-time analysis and utilization of mobile network data. In one embodiment, the real-time intelligence system 300 is a stand-alone system, while in another embodiment the real-time intelligence system 300 is part of a system for managing mobile operations and customer relations. In one embodiment, the real-time intelligence system 300 is part of an interoperation provider's system. In one embodiment, the real-time intelligence system 300 includes two major components: a real-time intelligence platform 310 and a group of applications 350.

The real-time intelligence platform 310 is a configurable platform to support real-time decision making. The real-time intelligence platform 310 leverages the combination of mobile network data from multiple mobile network operators and supports the use of external data sources (e.g. enterprise customer relationship management data), in one embodiment. The real-time intelligence platform 310 collects data from a variety of different sources and is capable of providing intelligence to many different applications, in one embodiment. Because it responds to incoming events in real-time, or near real-time, the real-time intelligence platform 310 allows quick implementation of new solutions. In one embodiment, the real-time intelligence platform 310 includes a rule configurator 320, a real-time intelligence engine 330, and a real-time event distributor 340. In one embodiment, the real-time intelligence platform 310 accesses a solution database 312. Although these logics are referred to as real-time, one of skill in the art would understand that actions may take place after calculations and decision making. The purpose of referring to these logics as real-time is to indicate that their response time is measured in sub-seconds, seconds, minutes, or hours, rather than days and weeks.

The rule configurator 320 receives and/or generates rules to configure the real-time intelligence engine 330 and the real-time event distributor 340. In one embodiment, the rule configurator 320 receives a set of rules 322 from a user with a proper level of authority. In another embodiment, the rule configurator 320 generates the rules by analyzing the historical data stored in the solution database 312. In one embodiment, the rules 322 reflect the business policy of the mobile network operator. In another embodiment, the rules 322 are based on trends identified based on an analysis of the historical network data.

The real-time event distributor 340 receives data events from a data adaptor 360 in one embodiment. In one embodiment, instead of or in conjunction with receiving data events from the data adaptor 360, the real-time event distributor 340 receives data events 342 directly. The real-time event distributor 340 forwards the received data events to the real-time intelligence engine 330 for analysis. In one embodiment, the real-time event distributor 340 sends reporting data 376 to applications 350 to report the data events received.

The data adaptor 360 collects data events from different sources and channels. In one embodiment, the data events include one or more of signaling (e.g., SS7 data), fraud control, messaging, clearing, number portability, location acquisition services, and multiple other types of communications internal to mobile network operators and sent between mobile network operators and/or third party systems. The third party systems may be interoperation providers, non-cellular network entities, e.g., Wi-Fi systems, or other third party systems. In one embodiment, the data events include all data related to roaming activities. In one embodiment, the data events include data that is not related to mobile communications, e.g., enterprise customer relationship management (CRM) data or externally derived third party information that is not related to mobile communication. In one embodiment, the third party information includes customer purchasing history, purchase preference, purchase pattern, wireless network usage, etc.

In one embodiment, the real-time intelligence system 300 may also utilize data provided for settlement services. The real-time intelligence system 300 enables collection of signaling and routing data. The servicing operators send their records to the data adaptor 360 to enable payment and interoperations. The clearing/settlement services of the real-time intelligence system 300 process these records. In one embodiment, the clearing and settlement relationships are available in real-time, the signaling and routing information is available in real-time, and the clearing and settlement records are post call information and are available within hours to several days. In one embodiment, the system can utilize partial data, as it is received.

As illustrated in FIG. 3, the data adaptor 360 receives data events 362 and 364. The data adaptor 360 may process the collected data events before sending them to the real-time event distributor 340. In one embodiment, the data adaptor 360 converts the collected data events to a universal format. In one embodiment, the data adaptor 360 normalizes the collected data events, e.g., adjusting values measured on different scales to a notionally common scale. In one embodiment, the data adaptor 360 categorizes each real-time event into an event type.

In one embodiment, this event type is used in correlation analysis. In one embodiment, the data adaptor 360 determines data correlations based on the collected data events. In one embodiment, the data adaptor 360 processes the received data events by correlating data events from several different sources. In one embodiment, event type is used for this correlation, e.g. "texting event" is correlated with other data, rather than the details of the particular texting event. For example, the data adaptor 360 may correlate mobile communication related network data with third party data and/or enterprise CRM data. In one embodiment, the data adaptor 360 correlates different types of mobile communication related network data.

The real-time intelligence engine 330 is an event based rules engine, in one embodiment. The real-time intelligence engine 330 is configurable to perform real-time decision making. The real-time intelligence engine 330 analyzes data from various sources and channels to make decisions, which may result in actions or alerts for other entities to perform actions, in real-time. The real-time intelligence engine 330, in one embodiment, includes a proactive intelligence module 332 and a rule-based automation module 334. The proactive intelligence module 332 identifies patterns in the data and triggers proactive actions and/or alerts in response to the identified patterns. The rule-based automation module 334 detects data events that satisfy pre-defined rules and performs actions and/or sends alerts based on these data events, as prescribed by the rules. In one embodiment, the data adaptor 360 correlates data events into a set of objectives and the real-time intelligence engine 330 performs real-time decision making based on the set of objectives.

The applications 350 include various application programs 351-354 performing a variety of different functions. Application programs 350 may include applications to provide use case reporting, data retrieval and presentation, roaming monitoring, business intelligence analysis, messaging, data clearing, customer relationship management, and billing. The applications 350, in one embodiment, can access a database 356 to retrieve application related information. In one embodiment, there are separate databases for different application programs. In another embodiment, one or more application programs may share the same databases.

The applications 350 send information and/or intelligence requests 374 to the real-time intelligence platform 310. In one embodiment, the application 350 sends a request 374 to the real-time event distributor 340, which forwards the requests to the real-time intelligence engine 330. In one embodiment, the real-time intelligence engine 330 analyzes data stored in the solution database 312 and formulates a response. The real-time intelligence engine 330 then sends the response 374 to the application 350, either directly or through the real-time event distributor 340. In another embodiment, the application 350 sends the requests to the real-time intelligence engine 330 directly and receives the response from the real-time intelligence engine 330.

In one embodiment, the real-time intelligence engine 330 sends alerts, recommendations, or actions 370 to the applications 350, proactively or in response to a request. In one embodiment, one or more of the applications 350 send application data 372 to the real-time intelligence engine 330 to facilitate data analysis.

In one embodiment, an authorized employee of the mobile network operator inputs a set of rules 322, which are sent to the real-time intelligence engine 330 through the rule configurator 320, to set up rules. In one embodiment, a customized interface is provided for setting up such rules, the customized interface providing a user-specific and user-skill level adjusted interface.

The data adaptor 360 collects data events from a variety of sources, processes the data events, and sends the data events to the real-time event distributor 340, which forwards the data events to the real-time intelligence engine 330. The real-time intelligence engine 330 processes the data events to determine if any of the data events trigger a user configured rule or a rule generated by analyzing stored historical data. If a rule is triggered, in one embodiment the real-time intelligence engine 330 sends an alert or a recommended action to the applications 350 to react to the data event proactively.

Figure 4:
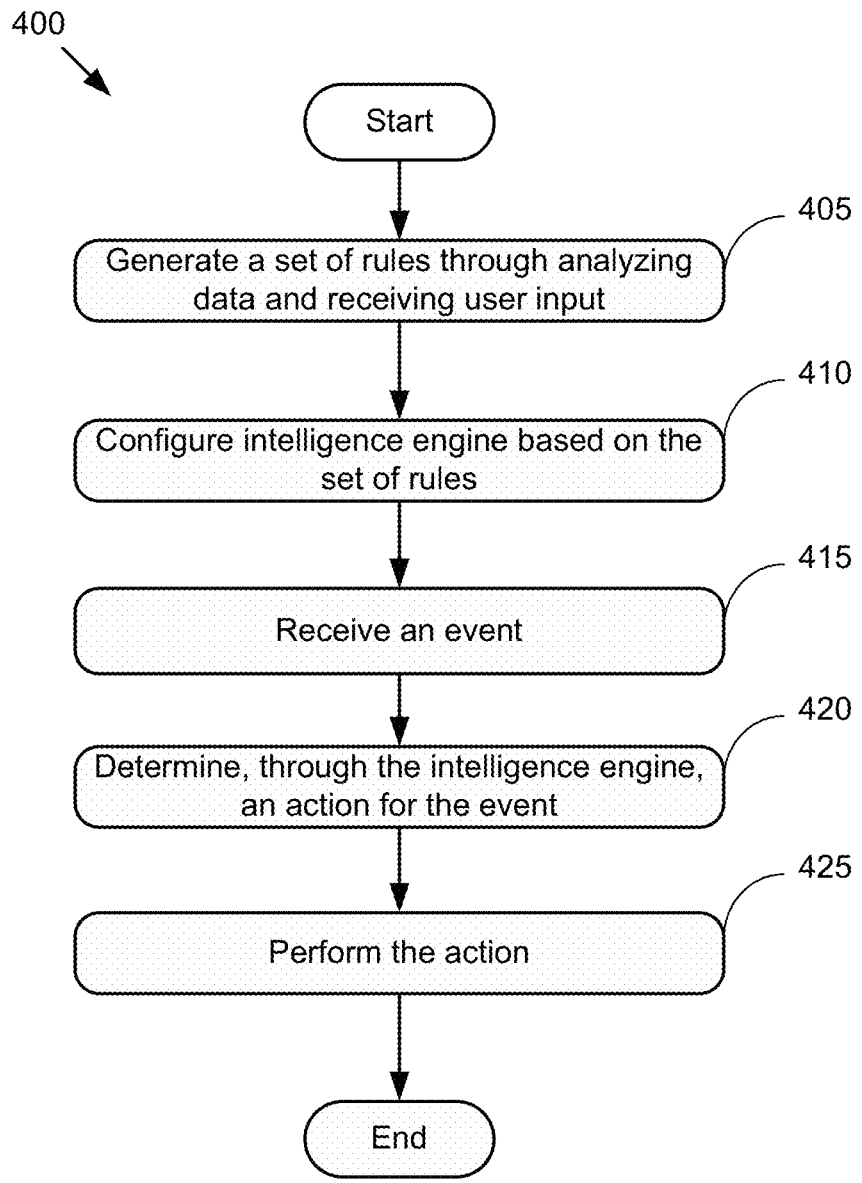
FIG. 4 is an overview flowchart of one embodiment of performing rule-based proactive actions.

FIG. 4 is an overview flowchart of one embodiment of a real-time intelligence system performing rule-based proactive actions. In one embodiment, the process 400 begins by generating (at block 405) a set of rules through analyzing data and/or through receiving user input. In one embodiment, the rule configurator 322 receives a set of rules through user input, as described above in FIG. 3.

At block 410, the process 400 configures the queries for the intelligence engine based on the set of rules. The process receives (at block 415) a data event. In one embodiment, the data event includes network usage records (e.g., Diameter Application data, RADIUS data, or other network usage data). In one embodiment, the data event includes network signaling data and data clearinghouse (DCH) data. In one embodiment, the data event includes enterprise CRM data. In one embodiment, the data event includes externally derived third party data that is not related to mobile communication. In another embodiment, the data event includes a request for information that can come from any channel. In one embodiment, the data event includes relevant information about a subscriber in the context of their mobile communication services. The relevant information may include subscriber information (e.g., name, home address, account type, IMSI, MSISDN, MDN, etc.), location information (current and historical), device information (e.g., make, model, capabilities, etc.), and network information (e.g., type, provider, performance, capabilities, etc.)

In one embodiment, the data adaptor 360 collects the data event, processes it, and sends it to the real-time event distributor 340, which then forwards the data event to the real-time intelligence engine 330. In one embodiment, the data adaptor 360 processes the received data event by correlating data events from several different sources. For example, the data adaptor 360 may correlate mobile communication related network data with third party data and/or enterprise CRM data. In one embodiment, the data adaptor 360 correlates different types of mobile communication related network data.

The process 400 determines (at block 420), through the intelligence engine, whether an action should be triggered in response to receiving the data event. In one embodiment, an action may be a pro-active action, such as configuring an end-customer's account, sending a notice to the customer, automated troubleshooting of mobile communication related problems, or customer care communication. In one embodiment, an action may be the generation of an alert to the mobile operator to be aware of something, or to take an action. In one embodiment, if the received data event satisfies a condition specified in a rule, the process triggers the corresponding action specified in the rule.

At block 425, the process 400 performs the determined action. A pro-active action, for example, may include sending a text message or an email containing an offer to mobile subscriber. In one embodiment, the action is updating a database. In one embodiment, the real-time intelligence engine 330 determines the actions to be taken based on the rules, and notifies the appropriate one or more applications 350, which then perform actions. In one embodiment, an action may be performed through multiple channels, e.g., through several different communication channels or through several different courses of actions. The process 400 then ends.

One of ordinary skill in the art will recognize that the process 400 is a conceptual representation of the operations used to perform proactive rule-based actions. The specific operations of the process 400 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 400 is performed by one or more software applications that execute on one or more computers.

Figure 5:
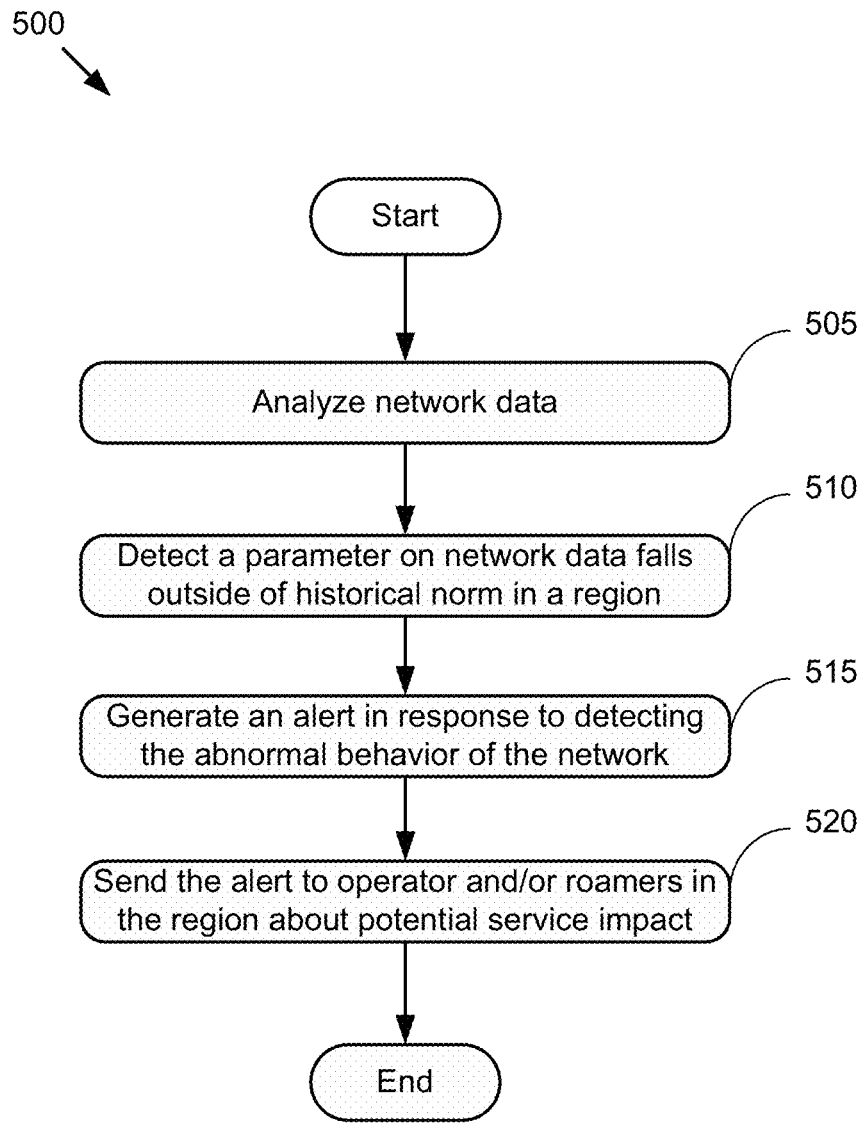
FIG. 5 is a flowchart of one embodiment of using trend analysis to detect roaming disruptions.

FIG. 5 is a flowchart of one embodiment of using trend analysis to detect roaming disruptions. Specifically, this figure describes a process 500 that detects roaming disruptions in a particular region. In one embodiment, the process 500 starts after an application program sends a request to the real-time intelligence engine. In another embodiment, the process 500 runs as a background process of the real-time intelligence system. In one embodiment, the process 500 begins by analyzing (at block 505) network data. In one embodiment, the data adaptor 360 collects the network data, and sends the data to the real-time intelligence engine 330 through the real-time event distributor 340. The real-time intelligence engine 330 then performs analysis on the data. In one embodiment, the analysis performed is as described above in FIG. 3. In one embodiment, the network data collected is the number of successful connections made by the network's subscribers per time period.

At block 510, the process 500 determines whether a parameter on network data falls outside of the historical norm for the given region. In one embodiment, the parameter is the roaming connection success count, as described below with respect to FIG. 6. The process generates (at block 515) an alert in response to detecting the abnormal behavior of the network. If the parameter is not outside the norm, the data is stored, and no alert is generated.

If the parameter is outside the norm, in one embodiment the process 500 sends (at block 520) the alert to the mobile network operator in one embodiment. In one embodiment, the process sends (at block 520) the alert to roaming subscribers in the region to notify them about a potential service impact. In one embodiment, the alert is sent in the form of an email. In another embodiment, the alert is sent in the form of a text message. In one embodiment, the real-time intelligence engine 330 detects the abnormal network behavior and notifies one of the applications 350. In one embodiment, the real-time intelligence engine 330 notifies the mobile network operator(s), and the mobile network operator(s) send out any notifications. The process 500 then ends.

One of ordinary skill in the art will recognize that the process 500 is a conceptual representation of the operations used to detect service disruptions. The specific operations of the process 500 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 500 is performed by one or more software applications that execute on one or more computers.

Figure 6:
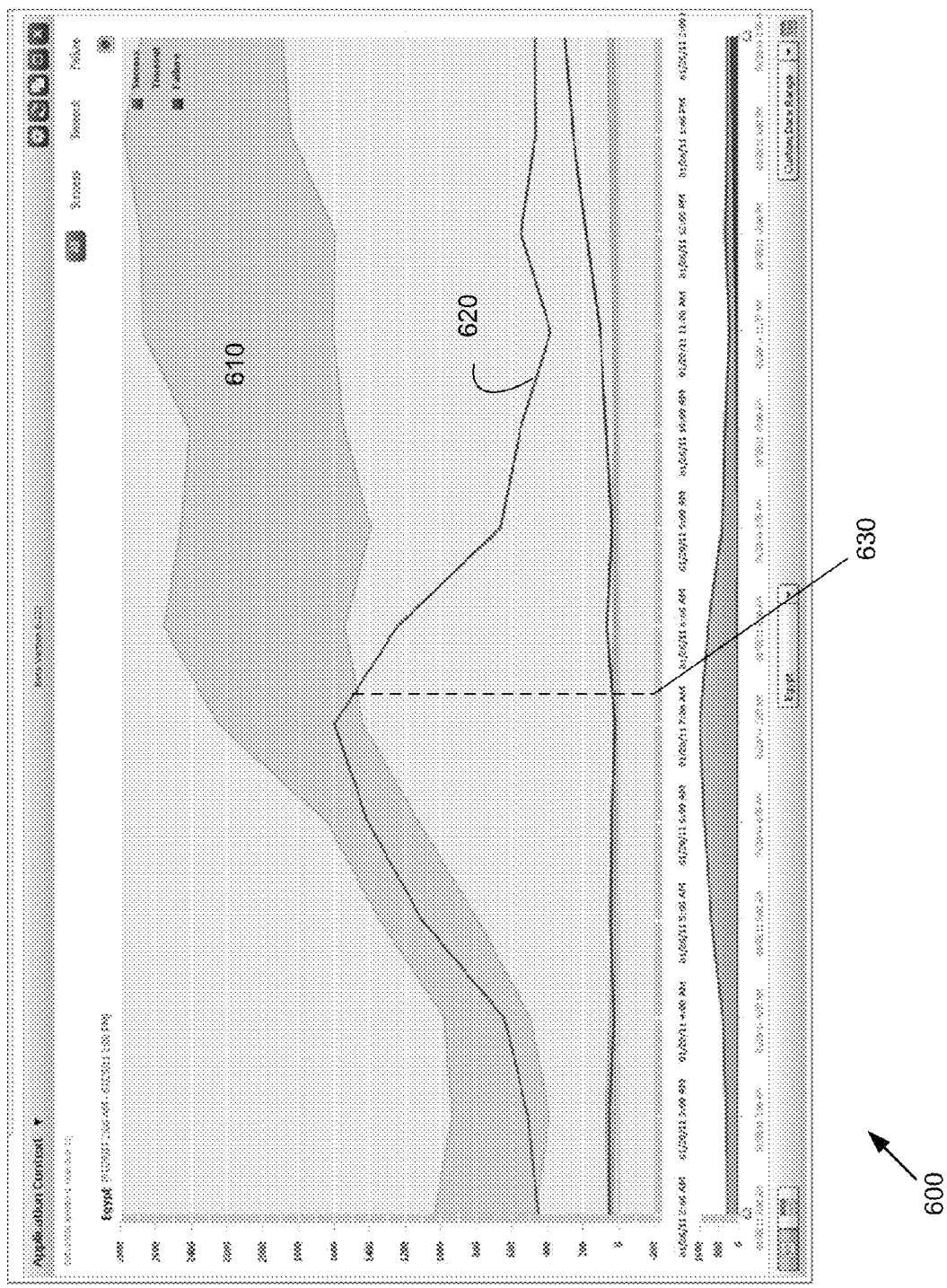
FIG. 6 is a graph of one embodiment of the trend data that may be used in trend analysis to detect roaming disruptions.

FIG. 6 is a graph of one embodiment of the trend data that may be used in trend analysis to detect roaming disruptions, and a graphical illustration of the results of the analysis of the trend data. Specifically, this figure shows a chart 600 that illustrates the historical norm of roaming connection success in Egypt and the current roaming connection success count. As illustrated in chart 600, the shaded area 610 represents the historical norm of roaming connection success count. In one embodiment, the real-time intelligence engine determines the historical norm 610 by performing an analysis on the mobile network data of a specified region or market. In one embodiment, the historical norm may include variation based on day, time, season, etc., and compares current data to the appropriate historical norms. The line 620 represents the current roaming connection success count. In one embodiment, the real-time intelligence engine calculates the current roaming connection success count 620 based on data received from mobile network operators.

As illustrated in chart 600, the current roaming connection count 620 is within the historical norm 610 before time 630. However, after time 630, the current success count 620 drops significantly and moves outside of the historical norm 610. Because the real-time intelligence engine is able to derive the historical norm 610 from historical network data and receive real-time network data, the real-time intelligence system is able to detect abnormal behaviors of the mobile networks in real-time and respond to the abnormal network behaviors quickly. In one embodiment, the system may present such a graphical illustration of the analysis to a mobile operator to show the issue. In another embodiment, the data presented graphically may be shown only as an alert or an indicator describing the deviation from the historical norms. Such an alert enables the mobile operator to resolve any technical issues and address any roaming-agreement based issues promptly.

Figure 7:
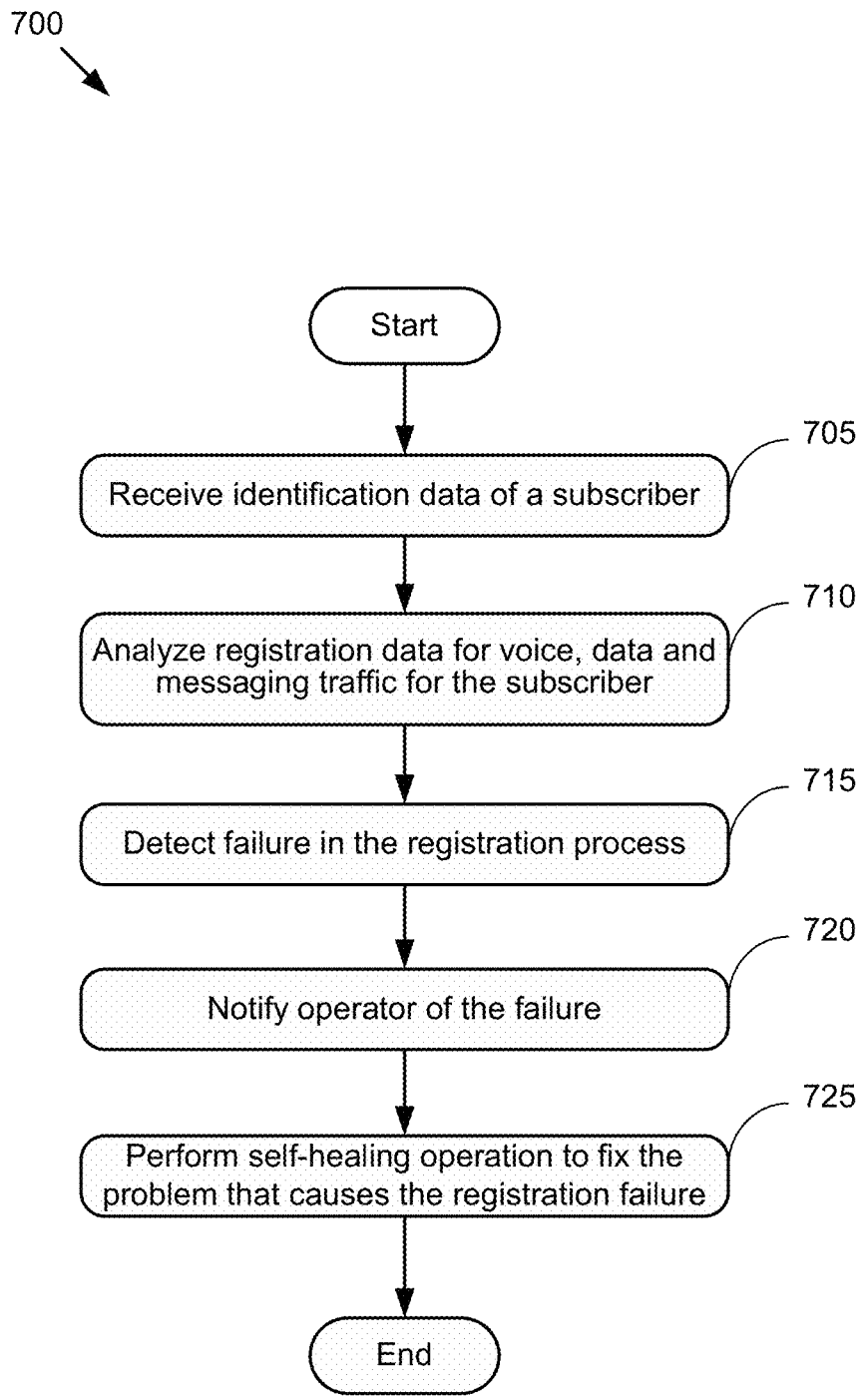
FIG. 7 is flowchart of one embodiment of detecting subscriber access disruption.

For certain high value or important mobile subscribers, the mobile network operator wants to ensure that their connectivity is continuous with high quality service. FIG. 7 is a flowchart of one embodiment of detecting subscriber access disruptions. Specifically, this figure describes a process 700 that detects registration failures for a subscriber.

In one embodiment, the process 700 starts after one or more high value subscribers are identified. In one embodiment, an application program sends a request to the real-time intelligence engine to monitor network data related to the subscriber. In one embodiment, the process 700 begins by receiving (at block 705) identification data of a subscriber. In one embodiment, the identification data is the International Mobile Subscriber Identity (IMSI) of the subscriber. In one embodiment, the identification data is a Temporary Mobile Subscriber Identity (TMSI) of the user device assigned by a visitor location register (VLR) when the user device is switched on in the geographical area serviced by the VLR.

At block 710, the process 700 analyzes registration data for voice, data, and messaging traffic for the subscriber based on the received identification data. In one embodiment, the real-time intelligence system utilizes signaling data (i.e., mobile registrations and registration updates) to monitor the subscriber registrations. The process detects (at block 715) a failure in the registration process or connectivity of the subscriber.

In one embodiment, the process 700 notifies (at block 720) the mobile network operator of the registration or connectivity failure. At block 725, the process 700 performs self-healing operation to fix the problem. In one embodiment, the self-healing operation comprises attempting to re-register on the network on which the registration failed. In one embodiment, the self-healing operation comprises registering the user on another network that provides service in the area. In one embodiment, this may be done even if roaming charges would be incurred for such a registration. In one embodiment, in such instances, roaming charges may be waived for the subscriber.

In one embodiment, the system also notifies the subscriber of the current registration status. In one embodiment, the real-time intelligence engine 330 detects the registration failure and notifies the operator and an application 350, which then performs the self-healing operations and notifies the subscriber, as described above. The process 700 then ends.

One of ordinary skill in the art will recognize that the process 700 is a conceptual representation of the operations used to detect service disruptions to a subscriber. The specific operations of the process 700 may not be performed in the exact order shown and described. For example and in one embodiment, the blocks 720 and 725 are performed in parallel or in reverse order. The specific operations may not be performed in one continuous series of operations, and different specific operations may be performed in different embodiments. Furthermore, the process could be implemented using several sub-processes, or as part of a larger macro process. For instance, in some embodiments, the process 700 is performed by one or more software applications that execute on one or more computers.

In one embodiment, the real-time intelligence system is able to monitor subscriber service consumption against consumption thresholds according to subscriber's cellular plan to avoid bill shock. Bill shock occurs when a customer gets an unexpectedly large bill for having exceeded the included time, messaging, roaming, and/or bandwidth usage. When the consumption thresholds are exceeded, in one embodiment the system notifies the subscriber via an automatic message, email, call, or other communication. In one embodiment, this functionality is accomplished through an application program called a roam monitor that sets a policy to monitor service usage by the real-time intelligence engine and sends notification to the subscriber when the consumption thresholds are exceeded.

Figure 8:
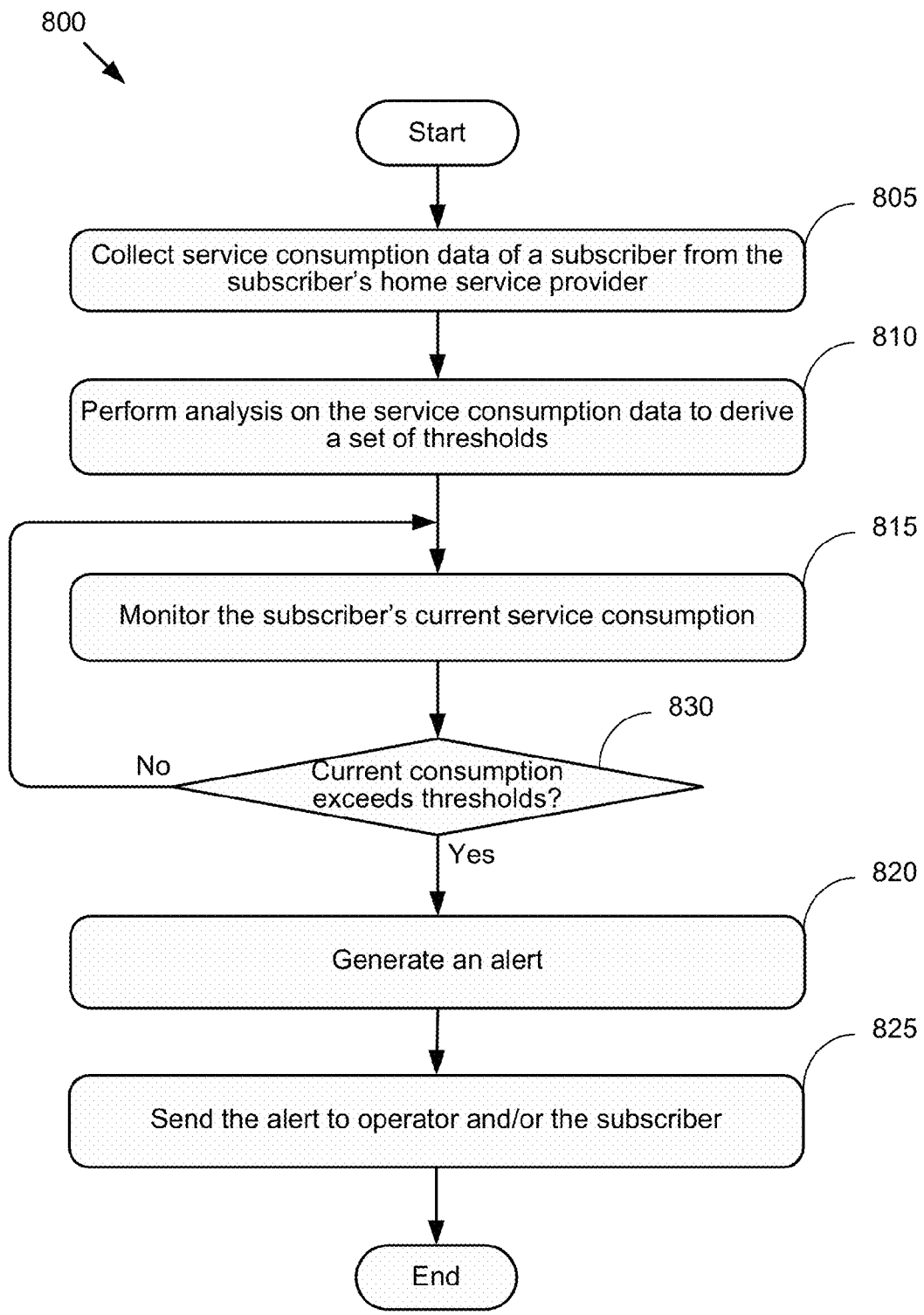
FIG. 8 is a flowchart of one embodiment of using a roam monitor.

FIG. 8 is a flowchart of one embodiment of using a roam monitor. Specifically, this figure describes a process 800 that detects excessive usage and notifies the subscriber. In one embodiment, the process 800 starts after the real-time intelligence engine receives a subscriber service usage monitoring request. In one embodiment, this may be done on a per mobile operator basis, per subscriber basis, or on another basis. In one embodiment, the process 800 begins by collecting (at block 805) service consumption data of subscribers from the subscribers' home service provider. In one embodiment, the service consumption data may include subscriber's usage of data, voice, and/or messaging services.

At block 810, the process 800 performs an analysis on the service consumption data to derive a set of thresholds. In one embodiment, the real-time intelligence engine derives the set of thresholds from the historical usage pattern of the subscriber. In another embodiment, the real-time intelligence engine derives the set of thresholds from the service plan that the subscriber is currently subscribed to. In one embodiment, the mobile operator sets the thresholds.

The process 800 monitors (at block 815) the subscriber's current service consumption, based on the set of thresholds. In one embodiment, the data adaptor 360 collects the current service consumption data, processes it, and sends it to the real-time event distributor 340, which then forwards the service consumption data to the real-time intelligence engine 330, as described above in FIG. 3. In one embodiment, the collective service consumption is calculated on a monthly basis in accordance with the subscriber's mobile plan.

Next, the process 800 determines (at 830) whether the subscriber's current service consumption exceeds the set of thresholds. The process 800 generates (at block 820) an alert if the subscriber's current mobile service consumption exceeds the set of thresholds. If the subscriber's current mobile service consumption does not exceed the set of thresholds, the process 800 loops back to block 815 to continue monitoring the subscriber's usage data.

At block 825, the process 800 sends an alert to the mobile network operator and/or the subscriber. In one embodiment, the alert sent to the subscriber includes an offer for a new more appropriate service plan. In one embodiment, the alert is sent through a message or an email to the subscriber. In one embodiment, the real-time intelligence engine 330 generates the alert and notifies one application program of the applications 350, which then sends out the alert, as described above in FIG. 3. In another embodiment, the real-time intelligence engine generates the message to the mobile operator who may send the message to the subscriber. The process 800 then ends. In one embodiment, the message may allow the subscriber to request further information to enable fraud prevention. In one embodiment, the message is sent to the subscriber via a text message, email or another method for fraud prevention.

One of ordinary skill in the art will recognize that the process 800 is a conceptual representation of the operations used to detect excessive usage by a subscriber. The specific operations of the process 800 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 800 is performed by one or more software applications that execute on one or more computers.

Figure 9:
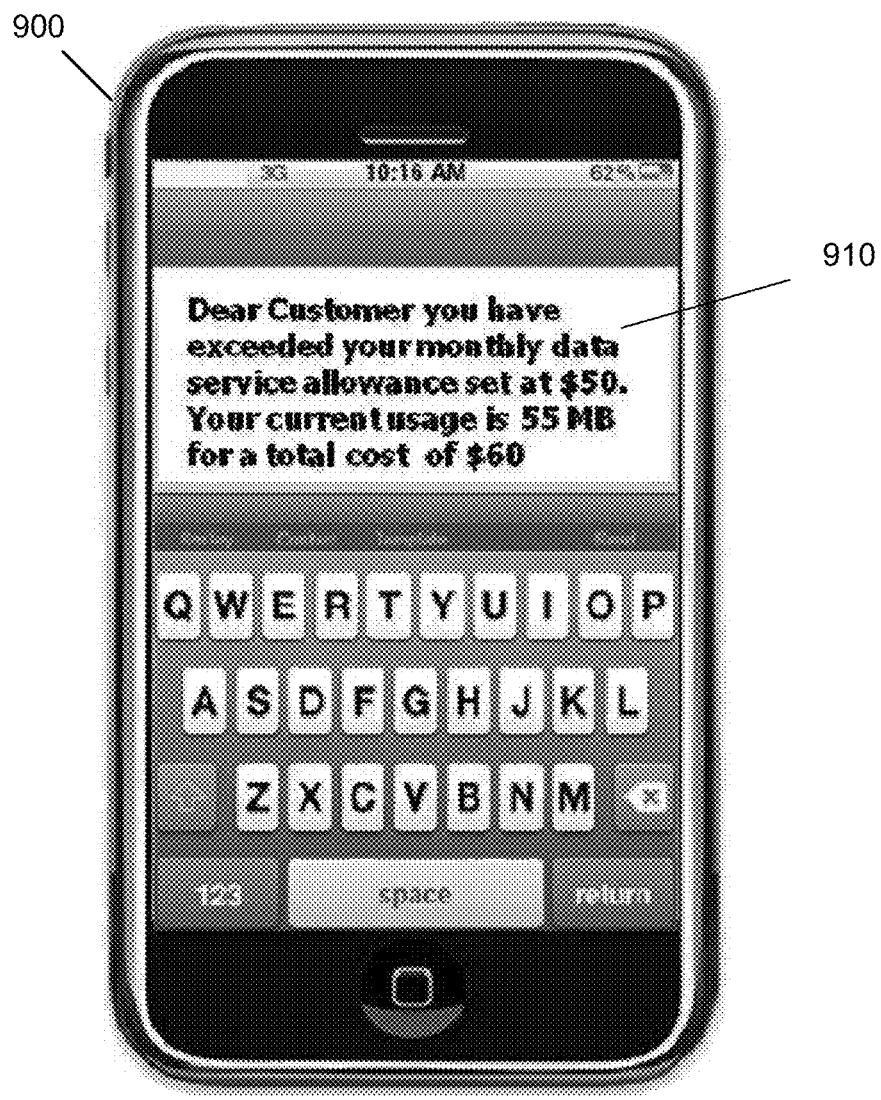
FIG. 9 is an exemplary communication that may be sent via a roam monitor.

FIG. 9 is an exemplary communication that may be sent. As shown in the figure, a wireless communication device 900 of a subscriber receives a message 910 saying that the subscriber has consumed $60 worth of data this month and exceeded the monthly data service allowance of $50. The message may be sent, in one embodiment, prior to the user exceeding his or her allowance of time, data, or messages. In one embodiment, the notification may include a cost, a usage, and/or a remaining use before incurring further costs. This enables the subscriber avoid an unexpectedly large bill by adjusting his or her behavior or by changing his or her subscription. In one embodiment, the notification may include an offer to upgrade the user's subscription, to one more in line with the user's service consumption pattern. In one embodiment, the service consumption pattern data from this user is evaluated, and an appropriate upgrade is offered.

In one embodiment, the real-time intelligence system monitors subscriber service consumption and contacts high spending subscribers to offer them new or more appropriate service plans. This solution increases the revenue of the mobile network operator and reduces customer complaints. In addition, this solution improves the mobile operators' capabilities to track or classify potential fraud cases.

In one embodiment, the real-time intelligence system provides a downloadable mobile application linked to the real-time intelligence system. The downloadable mobile application offers better interaction and real-time communication with the subscribers. For example and in one embodiment, the downloadable mobile application monitors subscriber data traffic and alerts the subscriber of any excessive usage. In one embodiment, the downloadable mobile application alerts the mobile network operator in case of Wi-Fi usage by the subscriber. In one embodiment, the downloadable mobile application offers service plan upgrades or special offers when the subscriber is approaching his/her maximum voice, data, and/or messaging allowance. In one embodiment, the mobile application enables the subscriber to track his or her usage in real-time. In one embodiment, the subscriber can also use the mobile application to alert the mobile network operator of service issues. The mobile application empowers the subscriber to take action in controlling his/her mobile experience.

Figure 10:
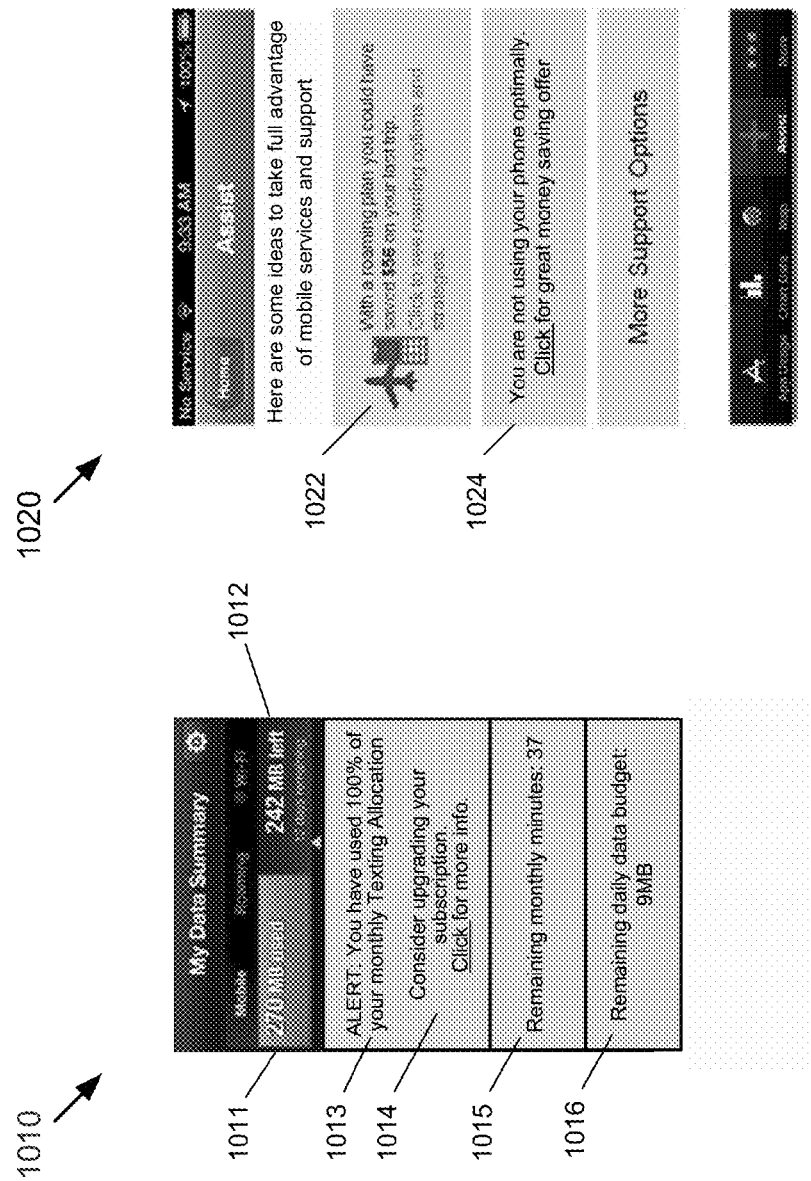
FIG. 10 shows some exemplary user interfaces of a downloadable mobile application.

FIG. 10 shows some exemplary user interfaces of a downloadable mobile application. Specifically, this figure shows a data summary view 1010 and a subscriber assistance view 1020 of one embodiment of a downloadable mobile application. As illustrated, the data summary view 1010 can show one or more of the current usage 1011 of the subscriber, the amount of usage left 1012, the forecast usage 1013, today's usage 1014. In one embodiment, usage may be shown as the remaining monthly usage 1015, and/or usage as a daily budget 1016. In one embodiment, the downloadable mobile application compiles this information. In another embodiment, the downloadable mobile application retrieves some or all of the information displayed in the data summary view 1010 from the real-time intelligence engine.

The subscriber assistance view 1020 shows a promotional offer 1022 and a recommendation 1024. The promotional offer 1022 introduces the subscriber to different service plans that may better suit the user's actual usage pattern or to special offers. Special offers may include discounts or one-time changes to the user's plan or other relevant offers. In one embodiment, these offers are customized to the user's actual usage pattern and history. The recommendation 1024 provides the subscriber with suggestions on how to improve his/her mobile experience. In one embodiment, the recommendation is customized based on the user's history. For example, recommendations may include calling someone with whom the user has long conversations slightly later, to fall under the "evening minutes" portion of the user's plan, or not calling from a particular location because that location is a roaming location, or other recommendations. Recommendations may also include recommendations to change tethering, charging, or other use patterns.

In one embodiment, the downloadable mobile application provides enhanced data monitoring. For example and in one embodiment, the downloadable mobile application monitors a subscriber's usage and generates notifications at certain thresholds for high usage. In one embodiment, the high usage alerts provide an opportunity to the user to change the data plan. In another embodiment, the downloadable mobile application enables the subscriber to check the current bill, and/or past bills, at any time.

In one embodiment, the downloadable mobile application reports subscriber status to the real-time intelligence system for analysis. In one embodiment, the downloadable mobile application captures current device status when the subscriber places or receives a call, sends or receives a message, or otherwise interacts with the network. The current device status includes one or more of: basic settings of the mobile device (e.g., Wi-Fi status and GPS status, etc.), recent usage status (e.g., battery charge status, signal strength, roaming, etc.), and historical usage data (e.g., roaming frequency, tethering frequency, Wi-Fi use frequency, device charging pattern, mobile application usage pattern, etc., and in one embodiment locations associated with the usage data).

In one embodiment, the real-time intelligence system performs analysis on subscriber status information that is collected by the downloadable mobile application. The real-time intelligence system generates appropriate warnings, recommendations, and/or promotional offers based on the result of the analysis. The real-time intelligence system then sends the warnings, recommendations and/or promotional offers to the subscriber and/or the operator through a variety of different channels. In one embodiment, the warnings, recommendations, and/or promotional offers are sent to the downloadable mobile application and presented to the subscriber through the mobile application.

Warnings, for example, may include a warning that the user is going to exceed his/her allocated data, voice, or messaging thresholds. In one embodiment, a warning to the mobile network operator may indicate that the user is utilizing WiFi tethering, when the user's service plan does not support tethering. Recommendations may include a recommendation to use tethering, if an appropriate WiFi signal is available, and the user's service plan supports tethering. Recommendations may also include suggestions, for example, to send fewer text messages, and instead switch to email. Promotional offers may include offers of a service plan that supports tethering or offers of a different service plan that provides more or different voice, data, or messaging services.

In one embodiment, the downloadable mobile application offers Wi-Fi tracking capabilities to allow the real-time intelligence system to provide better mobile solutions to the subscriber. In one embodiment, a user may be able to utilize a WiFi network, instead of a cellular network for some or all communications using their mobile device. In one embodiment, a promotional offer, suggesting a service that would enable the user to take advantage of such WiFi use, may be sent to the user. In one embodiment, the system may be set up to enable alerts regarding the availability of this option. In one embodiment, the user may set up the mobile device to automatically use the available WiFi. In that case, in one embodiment, the alerts may automatically trigger this configuration.

Figure 11:
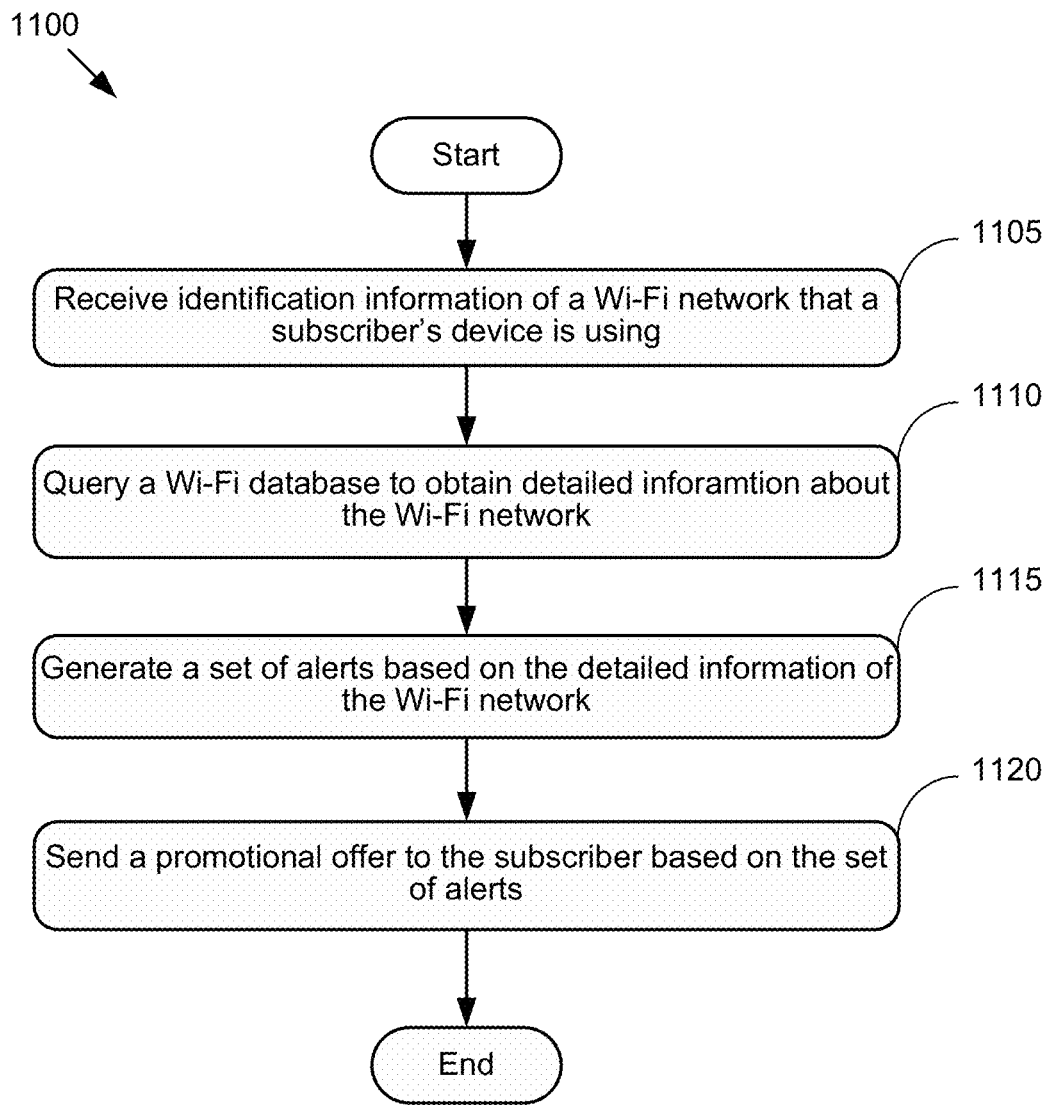
FIG. 11 is a flowchart of one embodiment of performing Wi-Fi tracking.

FIG. 11 is a flowchart of one embodiment of performing Wi-Fi tracking. Specifically, this figure describes a process 1100 that sends promotional offers to the subscriber based on the Wi-Fi and/or location information received from the mobile device. In one embodiment, the process 1100 is available after the downloadable mobile application is launched on the mobile device. In one embodiment, the process is available when it is enabled by the user. The process 1100 begins by receiving (at block 1105) user location information and/or identification information of a Wi-Fi network that a subscriber's mobile device is currently connected to. In one embodiment, the subscriber needs to grant permission to the mobile application in order for the mobile application to send this information to the real-time intelligence engine. In one embodiment, the Wi-Fi identification information is the basic service set identification (BSSID) of the Wi-Fi network.

At block 1110, the process 1100 queries a database to obtain information about the Wi-Fi network. In one embodiment, the information about the Wi-Fi network includes the services of the Wi-Fi network that the subscriber is using, the location of the Wi-Fi network, and the bandwidth available using the WiFi network. In one embodiment, this data may be retrieved based on user location. In another embodiment, this data may be retrieved based on the WiFi network data provided by the user.

The process 1100 optionally generates (at block 1115) an alert based on the information. In one embodiment, the process 1100 sends (at block 1120) a promotional offer to the subscriber based on the alert. For example and in one embodiment, the process sends a promotional offer to the subscriber, suggesting that the subscriber obtain an application enabling use of the Wi-Fi network instead of the cellular network for voice, messaging, and/or data communication based on the Wi-Fi information. In one embodiment, the process sends a recommendation to a user who already has this feature available to switch to the WiFi network.

In one embodiment, the downloadable mobile application continuously monitors the user's location and mobile device WiFi connections. In one embodiment, the mobile device or server can provide communications or alerts when the Wi-Fi network is available to the user. In one embodiment, prior to providing an availability alert, the process 110 verifies that the WiFi network has sufficient capability to successfully carry the network traffic.

One of ordinary skill in the art will recognize that the process 1100 is a conceptual representation of the operations used to perform Wi-Fi tracking. The specific operations of the process 1100 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1100 is performed by one or more software applications that execute on one or more computers.

Figure 12:
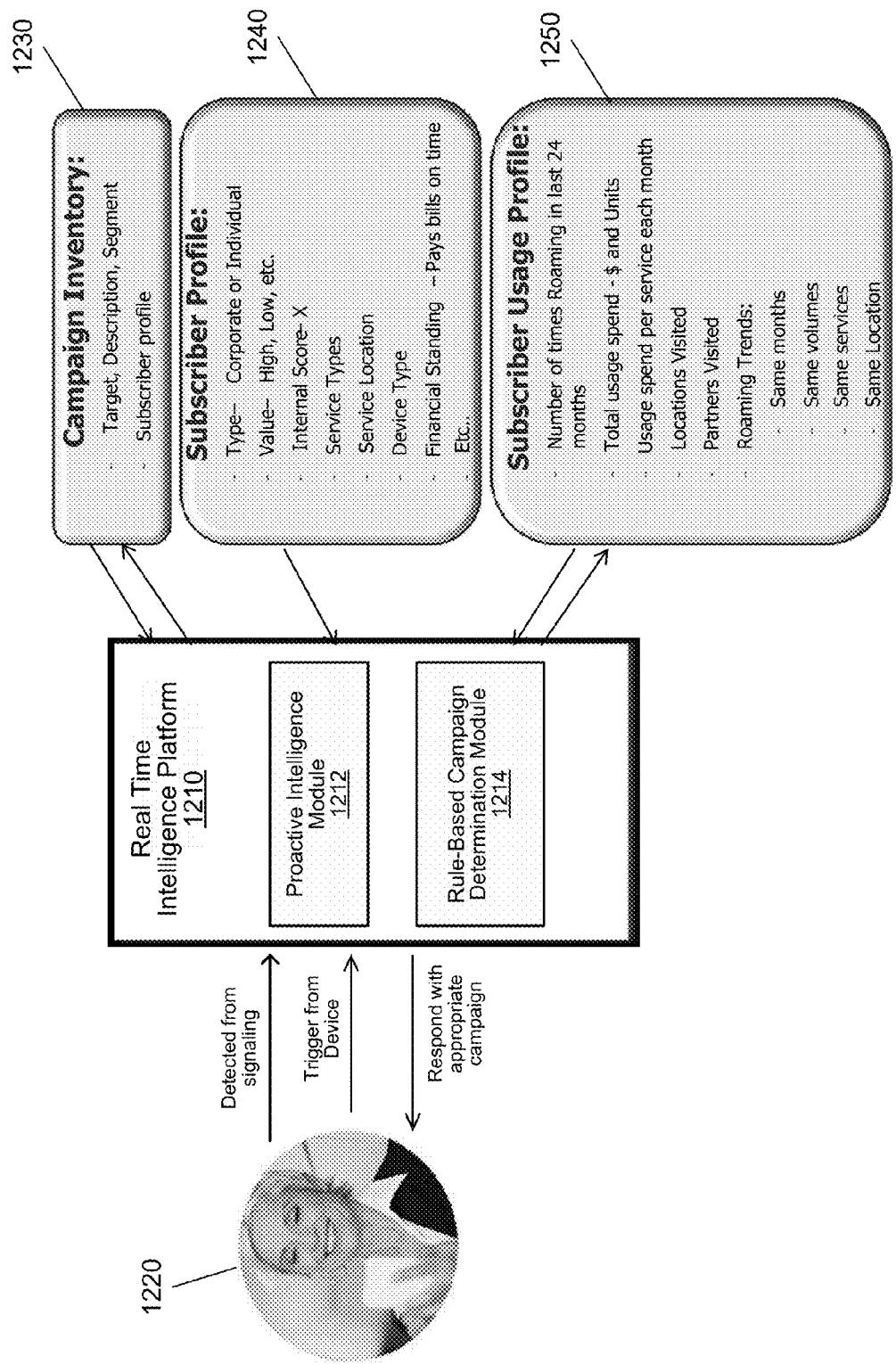
FIG. 12 is a block diagram of one embodiment of utilizing real-time monitoring for targeted campaigns.

FIG. 12 is a block diagram of one embodiment of utilizing real-time monitoring for targeted campaigns. As illustrated in the figure, a real-time intelligence platform 1210 receives a data event or a request from a subscriber's mobile device 1220. The real-time intelligence platform 1210 performs analysis based on a campaign inventory 1230, a subscriber profile 1240, and a subscriber usage profile 1250 to determine an appropriate campaign for the subscriber. The real-time intelligence platform 1210 sends the appropriate campaign to the subscriber's mobile device 1220.

The real-time intelligence platform 1210 is a configurable platform to support real-time decision making. The real-time intelligence platform 1210 collects data from a variety of different sources and provides intelligence to many different applications. The details of one embodiment of the real-time intelligence platform 1210 are described above in FIG. 3. As illustrated in FIG. 12, the real-time intelligence platform 1210 in one embodiment includes a proactive intelligence module 1212 and a rule-based campaign determination module 1214. The proactive intelligence module 1212 identifies patterns in data and triggers proactive actions in response to the identified pattern. The rule-based campaign determination module 1214 detects data events that satisfy pre-defined rules and determines an appropriate campaign based on the satisfied rules. In one embodiment, the rules are configured by the mobile network operator. In another embodiment, the rules are generated by analyzing historical network usage data.

A campaign inventory 1230 includes a list of one or more available campaigns. The subscriber profile 1240 is received on-demand from the customer relationship management system, on-demand from a billing database, another application program, files loaded by the mobile network operator, a real-time interface, or any combination of these or other sources. The profile data may be pushed from one or more sources and/or pulled from one or more sources. Subscriber profile 1240, in one embodiment, includes the mobile devices of the subscriber, the subscription plan of the subscriber, and other relevant generally static information. The subscriber usage profile 1250 includes usage of subscribers so that the real-time intelligence platform 1210 can analyze usage trends of the subscribers. The usage profile 1250 includes what mobile services are used by the subscriber, and when. In one embodiment, the usage profile 1250 is continuously updated with additional data.

In one embodiment, the real-time intelligence platform 1210 receives the request for campaign determination from the subscriber's mobile device 1220. In another embodiment, the real-time intelligence platform 1210 detects a signaling event and triggers the campaign determination. In one embodiment, the request for campaign determination is received from the mobile network provider.

Figure 13:
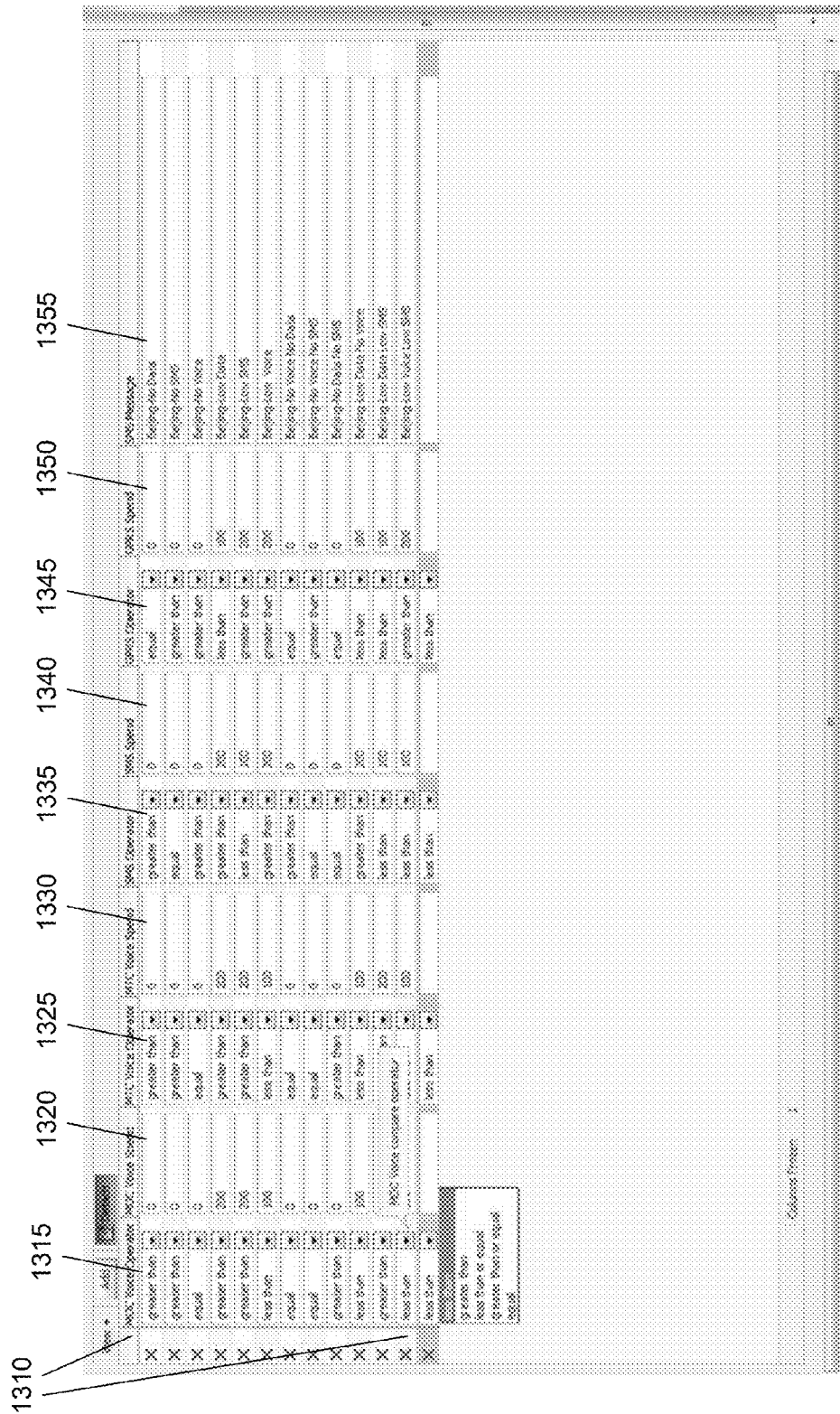
FIG. 13 is one embodiment of a user interface for rule configuration in order to detect silent low spenders.

In one embodiment, the real-time intelligence platform 1210 detects silent low spenders and sends promotional offers to the silent low spenders. FIG. 13 is one embodiment of a user interface 1300 for rule configuration in order to detect silent low spenders. As illustrated in the figure, there are several rules 1310 configured in the user interface 1300. In one embodiment, only people with a certain level of authority (e.g., an employee of the appropriate department of the mobile network operator) can configure these rules using a user interface 1300. For each rule, one or more of the following data may be specified: an outgoing calls operator 1315, an outgoing call value 1320, an incoming call operator 1325, an incoming call value, a messaging operator 1335, an messaging value 1340, a data operator 1345, a data value 1350, and an message 1355.

A pair of operator and value for a service determines the condition under which a subscriber is qualified as a silent low spender of that service. For example, if the outgoing calls operator 1315 is defined as "less than" and the outgoing call value 1320 is defined as "200", a subscriber will be identified as a silent low spender when his or her outgoing calls for a certain period (e.g., the past month) is less than 200 minutes. In one embodiment, the value is the money spent by a subscriber. In another embodiment, the value is the actual usage units, e.g., minutes, messages, or megabytes, by a subscriber. The message 1355 is the text that will be sent to the mobile network operator and/or the subscriber when a silent low spender is identified based on the rule. The message may be sent via text messaging, email, call, or other method.

In one embodiment, the user interface may be simplified upon request to only allow adjustment of the number of units (e.g., dollars, minutes, megabytes, messages) below which the silent low spender identification is made.

Figure 14:
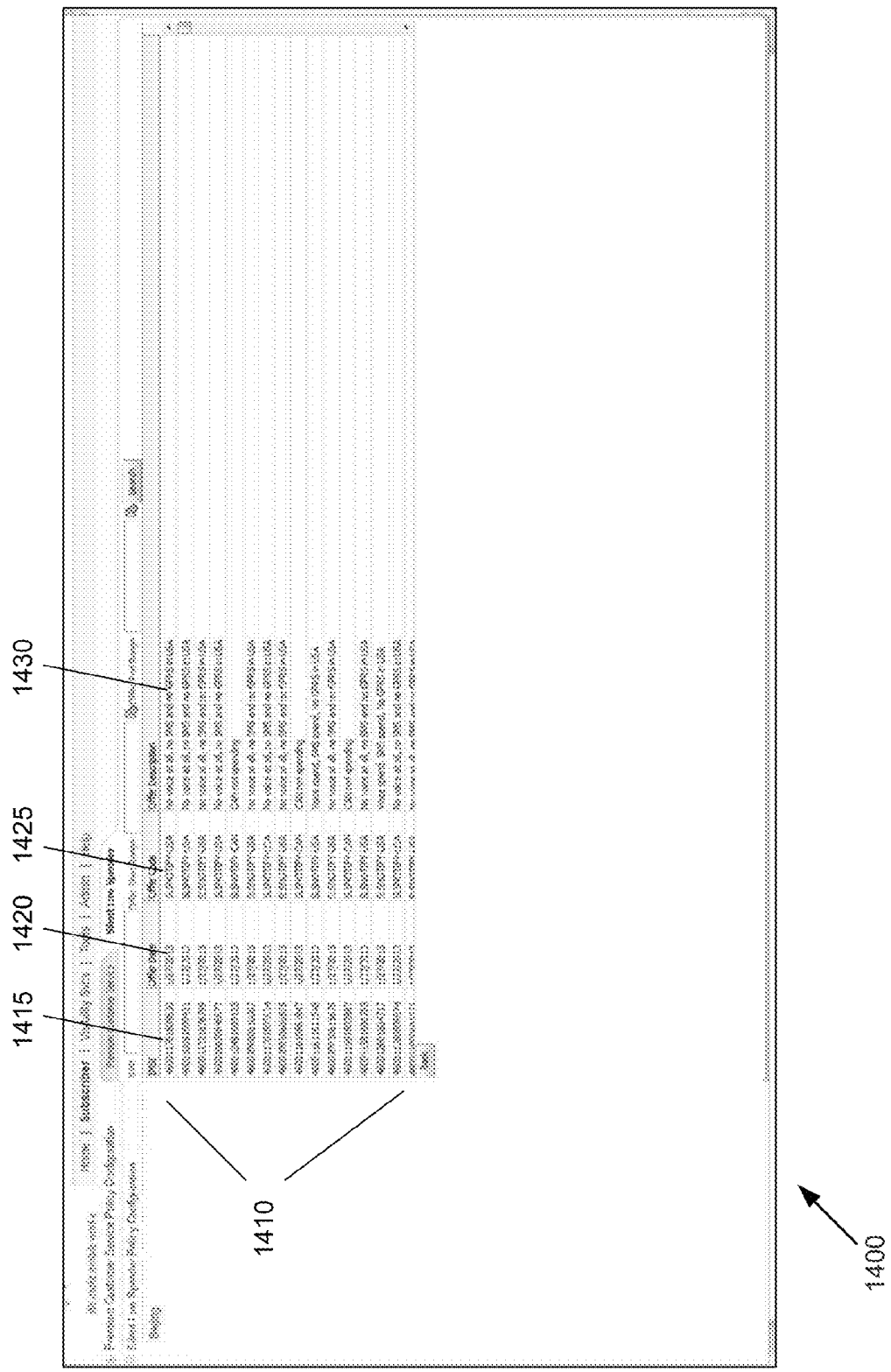
FIG. 14 is one embodiment of a user interface for displaying a silent low spender offer history.

FIG. 14 is one embodiment of a user interface 1400 for displaying the offer history of offers sent to silent low spenders. Specifically, this figure displays an offer history 1410 of all messages sent after detecting the silent low spender according to the rules set by the mobile network operator. Although this example focuses on silent low spender, one of skill in the art would understand that this is simply the identification of a campaign based on subscriber activity. Thus, the offer history may include offers based on overuse, underuse, misuse, or other factors.

Each offer in the offer history 1410 may include a subscriber identification 1415, an offer date 1420, an offer code 1425, and an offer description 1430 (in one embodiment the message sent after detecting the silent low spender or other relevant status that would trigger an alert), and whether or not a user has accepted the offer. In one embodiment, the subscriber identification 1415 is the IMSI of the subscriber. In one embodiment, the offer may also indicate whether it was accepted by the silent low spender. In one embodiment, the offer may also indicate whether the identified silent low spender's behavior changed after the offer was sent, and whether or not the offer was accepted.

Figure 15:
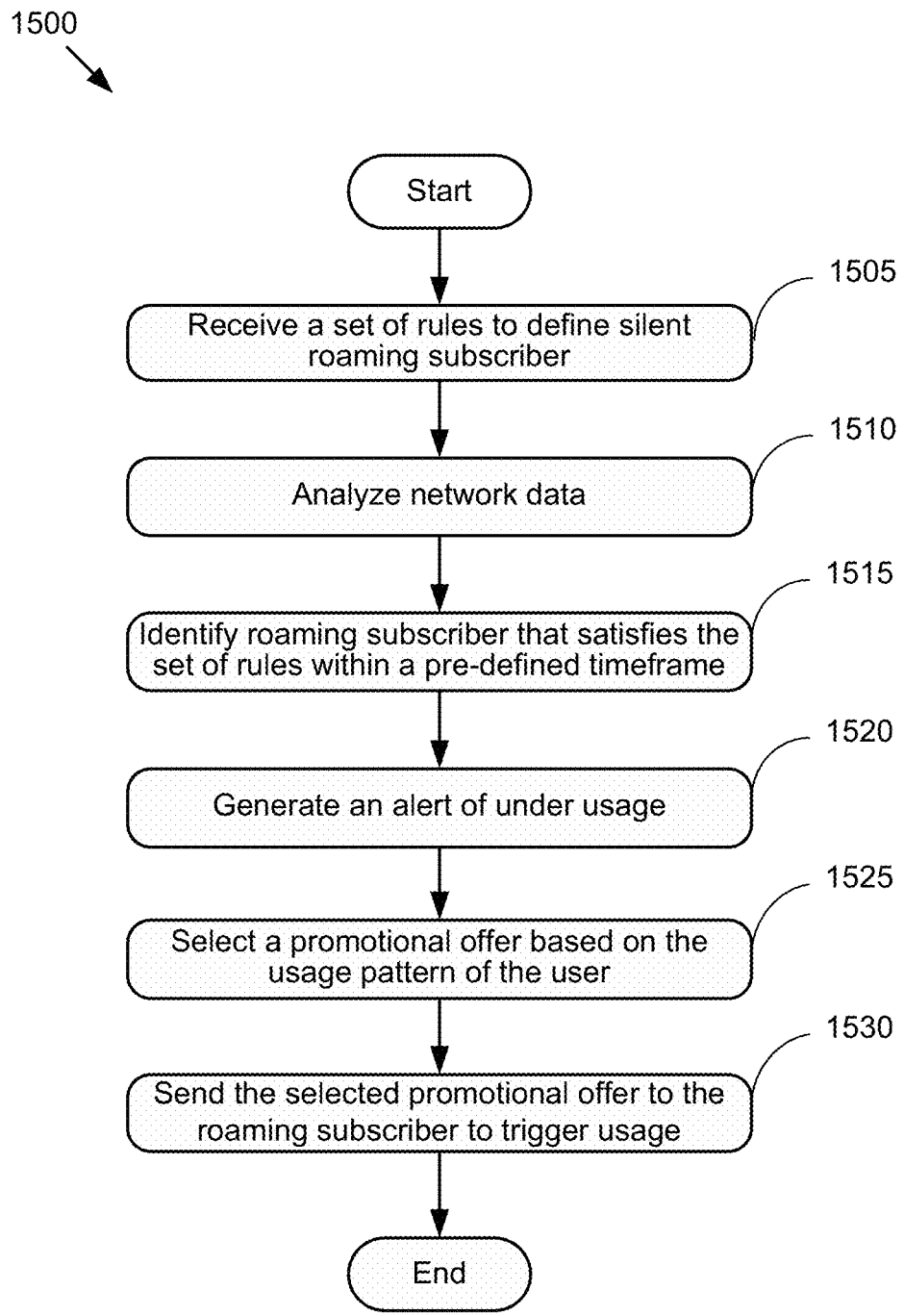
FIG. 15 is a flowchart of one embodiment of identifying silent low spenders.

FIG. 15 is a flowchart of one embodiment of identifying silent low spenders. Specifically, this figure describes a process 1500 that identifies low spending roaming subscribers and sends the identified subscribers targeted promotional offers to trigger usage. In one embodiment, the process 1500 starts after the real-time intelligent engine receives a request for identifying silent low spenders. As shown in the figure, the process 1500 begins by receiving (at block 1505) a set of rules to define silent low spending subscribers. In one embodiment, authorized employees of the mobile network operator may configure the set of rules using the user interface 1300 described above in FIG. 13.

At block 1510, the process 1500 analyzes network data. In one embodiment, the network data includes the subscriber profile 1240 and the subscriber usage profile 1250 described above in FIG. 12.

The process 1500 identifies (at block 1515) a subscriber that satisfies the set of rules within a pre-defined timeframe. Next, the process 1500 generates (at block 1520) an alert of under usage. At block 1525, the promotional offer is selected, based on the usage pattern of the user. At block 1530, the process sends the selected promotional offer to the roaming subscriber to trigger usage. The system adds the promotion to list of offers made. In one embodiment, the system tracks the user's behavior after the offer as well. The process 1500 then ends.

One of ordinary skill in the art will recognize that the process 1500 is a conceptual representation of the operations used to detect silent low spenders. The specific operations of the process 1500 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1500 is performed by one or more software applications that execute on one or more computers.

Figure 16:
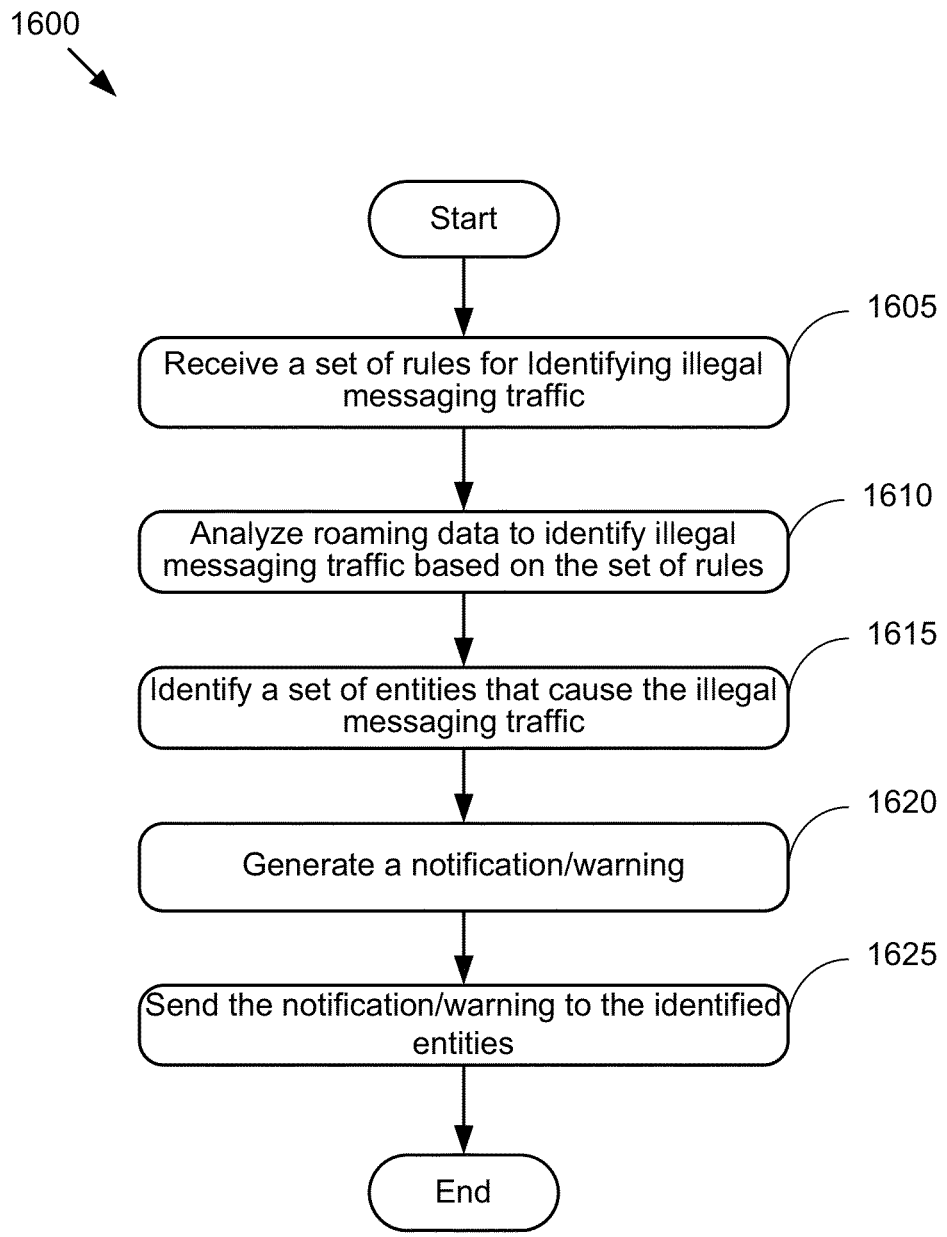
FIG. 16 is a flowchart of one embodiment of detecting revenue leakage.

FIG. 16 is a flowchart of one embodiment of detecting revenue leakage. Specifically, this figure describes a process 1600 that detects illegal messaging traffic and performs actions to resolve the issue. In one embodiment, the process 1600 starts after the real-time intelligence engine receives a request to detect illegal messaging traffic. As shown in the figure, the process 1600 begins by identifying (at block 1605) a set of rules for identifying illegal messaging traffic.

In one embodiment, the illegal messaging traffic is caused by a roaming partner of the mobile network operator that uses the home location register (HLR) lookup to identify the customer operator's subscriber location, and then resells the subscriber information to a third party mobile network operator that is able to terminate messaging traffic to the mobile network operator without having a valid roaming relationship in place with the mobile network operator.

In another embodiment, a non-mobile network operator entity (e.g. messaging aggregator or mobile marketer) is able to deliver illegal messaging traffic to the mobile network operator by using an existing roaming agreement between the mobile network operator and a third party mobile network operator. The end result is that the mobile network operator is not compensated for the termination of the traffic into its network, while the third party mobile network operator receives compensation from the non-mobile network operator entity for the termination of the traffic.

In another embodiment, a non-mobile network operator entity (e.g. messaging aggregator or mobile marketer) has access to the network and simulates a legitimate global title (GT) of a third party mobile network operator, therefore enabling it to deliver illegal messaging traffic to mobile network operator's subscribers. At the end of the billing period, the mobile network operator will invoice the third party mobile network operator (whose GT has been illegitimately used) for the traffic sent by the non-mobile network operator entity. The end result of this situation is an invoice dispute between the mobile network operators. The set of rules identified at block 1605 are generated based on these different scenarios. In one embodiment, these rules are received from mobile network operators. In another embodiment, these rules are automatically generated based on the identified fraudulent messaging traffic types.

At block 1610, the process 1600 analyzes the roaming data to detect illegal messaging traffic based on the set of rules. Next, the process identifies (at block 1615) when there is an entity that causes the illegal messaging traffic. In one embodiment, the real-time intelligence engine identifies a mobile network operator that was sending/receiving messages without a legitimate roaming agreement in place or has inconsistent data in the originator/recipient MAP/SCCP addresses.

At block 1620, the process 1600 generates a notification or warning, if such a fraudulent entity is identified. At block 1625, the process 1600 sends the notification or warning to the mobile network operator. This enables the mobile network operator to either disable the fraudulent activities or resolve them. In one embodiment, the process may send a warning to the identified entities. The process 1600 then ends.

One of ordinary skill in the art will recognize that the process 1600 is a conceptual representation of the operations used to detect revenue leakage. The specific operations of the process 1600 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1600 is performed by one or more software applications that execute on one or more computers.

Figure 17:
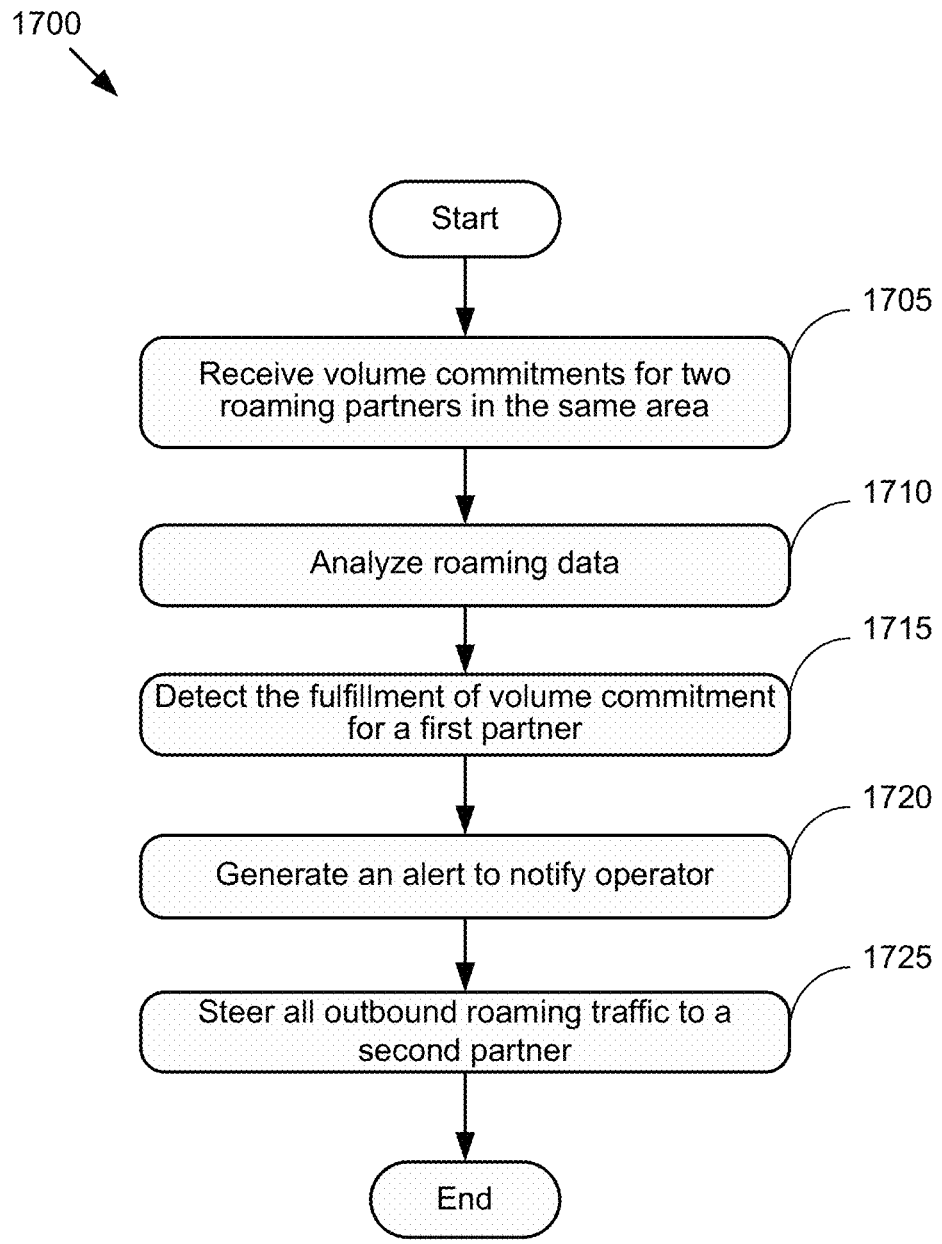
FIG. 17 is a flowchart of one embodiment of performing traffic balancing between roaming partners.

FIG. 17 is a flowchart of one embodiment of performing traffic balancing between roaming partners. Specifically, this figure describes a process 1700 that balance outbound roaming traffic between two roaming partners in order to secure volume commitments. In one embodiment, the process 1700 starts after the real-time intelligence engine receives a balance request. As shown in the figure, the process 1700 begins by receiving (at block 1705) volume commitments for two or more roaming partners in the same geographic area. Volume commitments indicate a minimum amount of roaming traffic each mobile network operator will direct to the other.

At block 1710, the process 1700 analyzes roaming data. Next, the process 1700 determines whether (at block 1715) the volume commitment for a first roaming partner has been fulfilled. At block 1720, the process 1700 generates an alert to notify the mobile network operator, if the volume commitment has been met. The process then steers (at block 1725) outbound roaming traffic to a second roaming partner to secure the volume commitment for the second roaming partner.

Thus, in one embodiment, the system preferentially uses one roaming partner, until the volume commitment to that roaming partner is met. In one embodiment, the roaming partners are selected based on one or more of volume commitment, costs, and penalties associated with not meeting the volume commitment. In another embodiment, the outbound traffic is distributed between roaming partners with commitments, until the commitment to a roaming partner is met. In one embodiment, the distribution may be even. In another embodiment, the distribution may be proportionate, based on the relative volume commitments. In another embodiment, the distribution may be based on cost or penalties. When the volume commitment to a roaming partner is met, traffic is distributed to other roaming partners who still have outstanding commitments, when possible. Once all roaming commitments are met, in one embodiment, the traffic distribution is based on cost, relationship, or proportionate volume commitments.

One of ordinary skill in the art will recognize that the process 1700 is a conceptual representation of the operations used to balance roaming traffic between roaming partners. The specific operations of the process 1700 may not be performed in the exact order shown and described. For example and in one embodiment, the operations of blocks 1720 and 1725 are performed in parallel or in reverse order. The specific operations may not be performed in one continuous series of operations, and different specific operations may be performed in different embodiments. Furthermore, the process could be implemented using several sub-processes, or as part of a larger macro process. For instance, in some embodiments, the process 1700 is performed by one or more software applications that execute on one or more computers.

Figure 18:
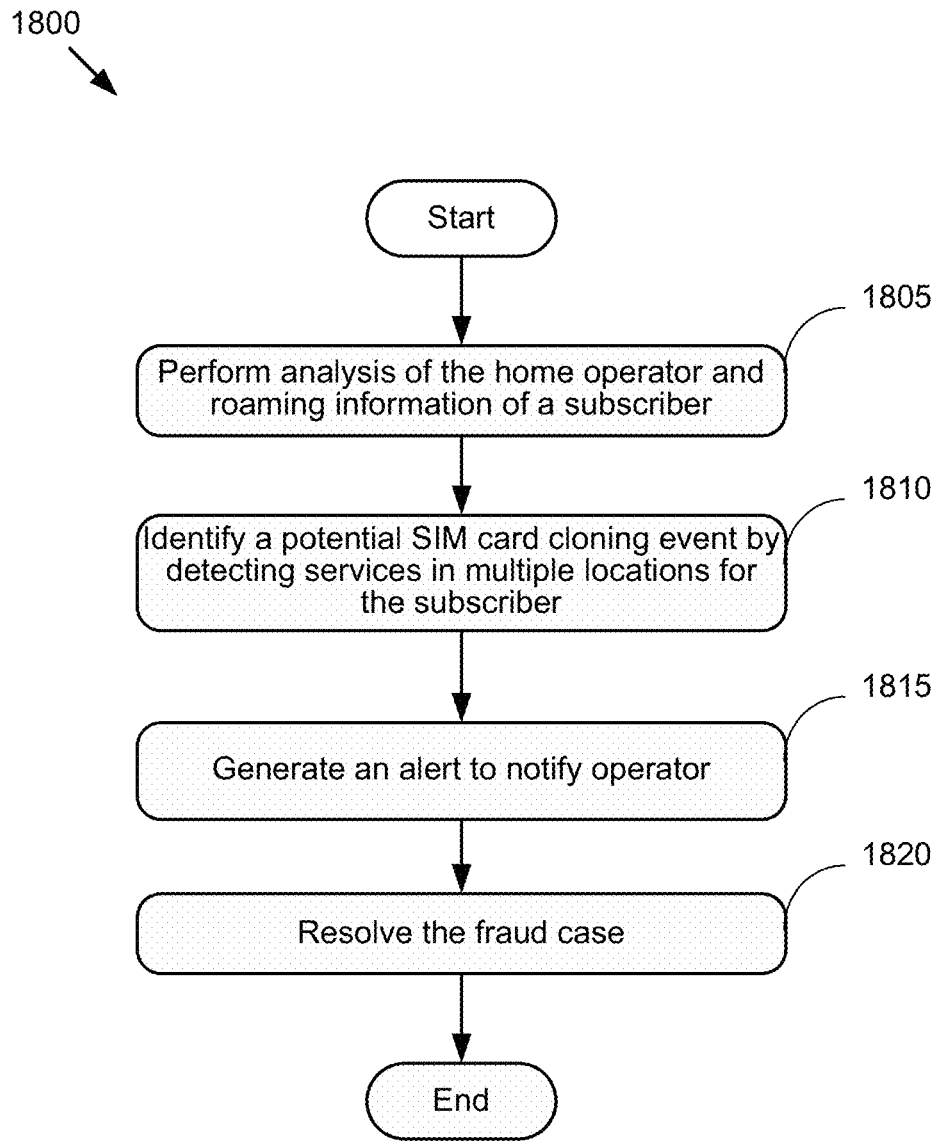
FIG. 18 is a flowchart of one embodiment of cloning fraud detection.

FIG. 18 is a flowchart of one embodiment of cloning fraud detection. Specifically, this figure describes a process 1800 that detects SIM card cloning. In one embodiment, the process 1800 starts after the real-time intelligence engine receives a request for cloning fraud detection. As shown in the figure, the process 1800 begins by performing (at block 1805) an analysis of the home mobile network operator and roaming information of a subscriber.

At block 1810, the process 1800 identifies a potential SIM card cloning event by detecting the SIM card being used to obtain services in multiple locations simultaneously, or by detecting an unreasonably quick move from one location to another. Next, the process 1800 generates (at block 1815) an alert to notify the mobile network operator. In one embodiment, at block 1820, the process 1800 resolves the fraud case. In one embodiment, the process resolves the fraud case by deactivating the subscriber. In one embodiment, the process resolves the fraud case by contacting the subscriber and having them validate their location, and disabling the cloned SIM card only. In one embodiment, the process resolves the fraud case by identifying the likely fraudulent SIM card, and disabling that. In one embodiment, the system may contact the subscriber, and send out a new SIM card to minimize service disruption. The process 1800 then ends.

One of ordinary skill in the art will recognize that the process 1800 is a conceptual representation of the operations used to detect SIM card cloning frauds. The specific operations of the process 1800 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1800 is performed by one or more software applications that execute on one or more computers.

Many of the methods of the disclosed embodiments may be performed with a digital processing system, such as a conventional, general-purpose computer system. Special purpose computers, which are designed or programmed to perform only one function, may also be used.

Figure 19:
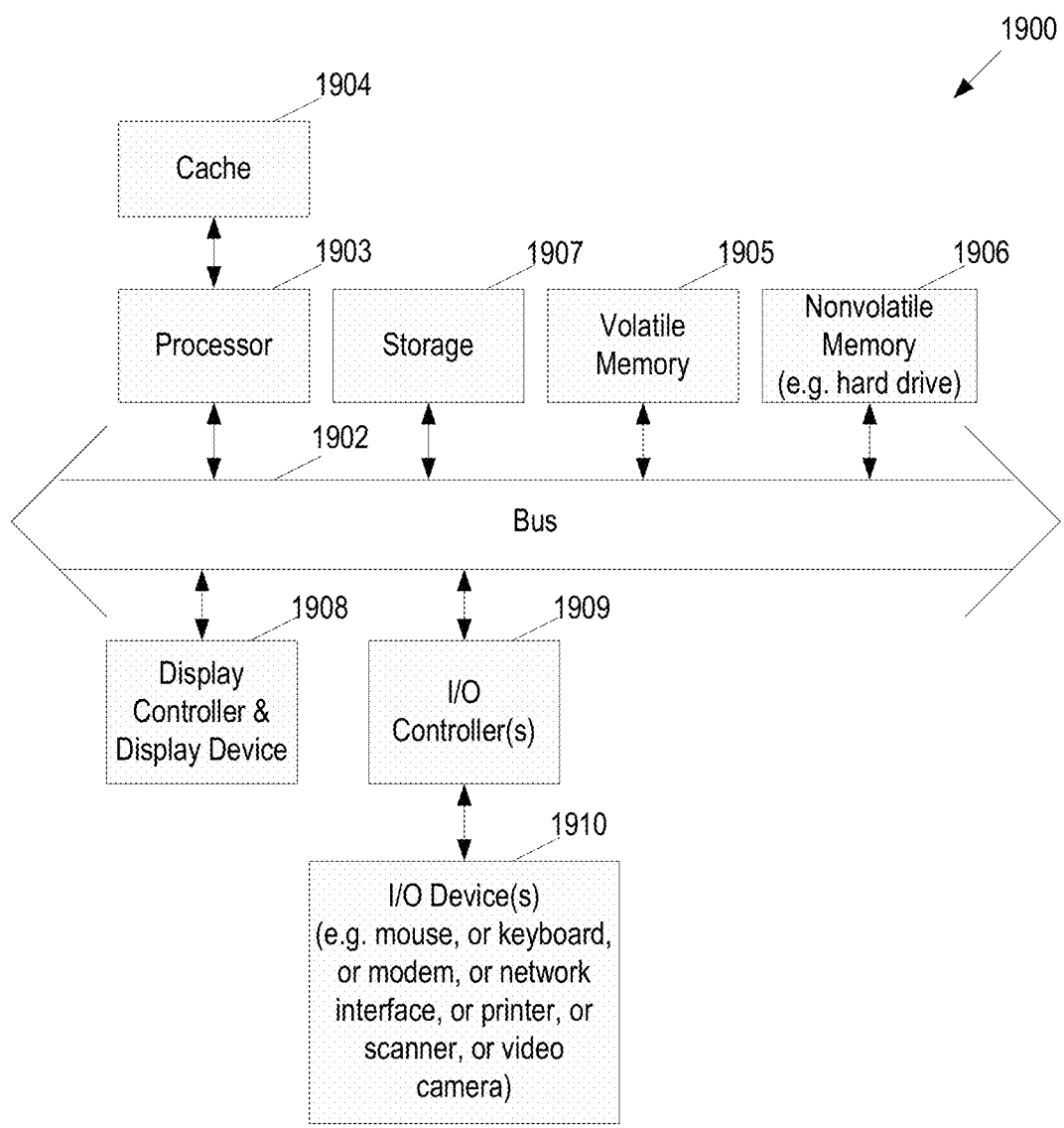
FIG. 19 is a block diagram of one embodiment of a computer system that may be used with the present invention.

FIG. 19 shows one example of a typical computer system or data processing system that may be used with the disclosed embodiments. For example, in one embodiment the processes described with respect to FIGS. 4, 5, 7, 8, 11, and 15-18 are operational through the example computing system. However, it is noted that while FIG. 19 illustrates various components of a computer system, it is not intended to represent any particular architecture or manner of interconnecting the components but rather provides an example representation of how the components and architecture may be configured. It will also be appreciated that network computers and other data processing systems that have fewer components or perhaps more components may also be used with the disclosed embodiments. The computer system of FIG. 19 may be any computing system capable of performing the described operations.

As shown in FIG. 19, the computer system 1900, which is a form of a data processing system, includes a bus 1902, which is coupled to one or more microprocessors 1903. In one embodiment, computer system 1900 includes one or more of a storage device (e.g., ROM) 1907, volatile memory (e.g., RAM) 1905, and a non-volatile memory (EEPROM, Flash) 1906. The microprocessor 1903 is coupled to cache memory 1904 as shown in the example of FIG. 19. Cache memory 1904 may be volatile or non-volatile memory.

The bus 1902 interconnects these various components together and in one embodiment interconnects these components 1903, 1907, 1905, and 1906 to a display controller and display device 1908. The computer system 1900 may further include peripheral devices such as input/output (I/O) devices, which may be mice, keyboards, modems, network interfaces, printers, scanners, video cameras and other devices which are well known in the art. Typically, the input/output devices 1910 are coupled to the system through input/output controllers 1909.

The volatile memory 1905 is typically implemented as dynamic RAM (DRAM), which requires power continually in order to refresh or maintain data in the memory. The non-volatile memory 1906 is typically a magnetic hard drive, magnetic optical drive, an optical drive, a DVD RAM, a Flash memory, or other type of memory system, which maintains data even after power is removed from the system. Typically, the non-volatile memory will also be a random access memory although this is not required.

While FIG. 19 shows that the non-volatile memory is a local device coupled directly to the rest of the components in the data processing system, it will be appreciated that the disclosed embodiments may utilize a non-volatile memory which is remote from the system, such as a network storage device which is coupled to the data processing system through a network interface such as a modem or Ethernet interface.

The bus 1902 may include one or more buses connected to each other through various bridges, controllers and/or adapters as is well known in the art. In one embodiment the I/O controller 1909 includes a USB (Universal Serial Bus) adapter for controlling USB peripherals, and/or an IEEE-1394 bus adapter for controlling IEEE-1394 peripherals.

It will be apparent from this description that aspects of the disclosed embodiments may be embodied, at least in part, in software (or computer-readable instructions). That is, the techniques, for example the processes of FIGS. 4, 5, 7, 8, 11, and 15-18 may be carried out in a computer system or other data processing system in response to its processor, such as a microprocessor, executing sequences of instructions contained in a memory, such as storage device 1907, volatile memory 1905, non-volatile memory 1906, cache 1904 or a remote storage device. In various embodiments, hardwired circuitry may be used in combination with software instructions to implement the disclosed embodiments. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as microprocessor 1903.

A machine readable storage medium can be used to store software and data which when executed by a data processing system causes the system to perform various methods of the disclosed embodiments. This executable software and data may be stored in various places including for example storage device 1907, volatile memory 1905, non-volatile memory 1906 and/or cache 1904 as shown in FIG. 19. Portions of this software and/or data may be stored in any one of these storage devices.

Thus, a machine readable storage medium includes any mechanism that stores any information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.)

The detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The detailed description is, therefore, not to be taken in a limiting sense, and the scope of the present invention is defined by the appended claims.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed description were presented as procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending" or "receiving" or "displaying" or "calculating" or "determining" or "multiplying" or "computing" or "identifying" or the like, refer to the action and processes of a computer system, or similar electronic computing device that manipulates and transforms data represented as physical (electronic) quantities within the computer system's registers and memories and other computer readable media into other data similarly represented as physical quantities within the computer system's memories or registers or other such information storage, transmission or display devices.

In the foregoing specification, the disclosed embodiments have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of providing an enhancement to mobile communication service, the method comprising:
monitoring network and non-network data by an interoperations system coupled between a plurality of mobile cellular network operators to provide roaming services and accounting for the roaming, the interoperations system not integrated with any of the mobile cellular network operators, the monitoring including receiving network data events from the plurality of mobile cellular network operators comprising:
network signaling and usage records including one or more of Diameter, General Packet Radio Service (GPRS) protocol data including one or more of GTPu and GTP-C, Signaling System No. 7 protocol (SS7) data, RADIUS records, data clearinghouse (DCH) data, and
non-network data including one or more of: subscriber profile data, subscriber billing data, mobile device application data;
correlating the received data events;
determining in real-time an action to be taken in response to a correlated data event based on a set of rules; and
performing the action, where the action may be directed at one or more of the mobile cellular network operator, a mobile subscriber of the mobile cellular network operator, and a corporate enterprise user.

2. The method of claim 1, wherein the network data includes one or more of: mobile communications usage record, and a request for information, and wherein the monitoring is performed by an interoperations system, which provides interoperation between the plurality of mobile network operators.

3. The method of claim 1, wherein the action comprises one or more of: sending a message with an offer to the mobile subscriber, sending a message with a recommendation to the mobile subscriber, sending a message with usage statistics to the mobile subscriber, sending a message with a status update to the mobile subscriber, sending an alert to the mobile cellular network operator, or automated troubleshooting of a mobile communication related problem.

4. The method of claim 1 further comprising configuring an intelligence engine based on the set of rules, wherein the action is determined by the intelligence engine.

5. The method of claim 4, further comprising:
receiving the set of rules from a user with a proper level of authority.

6. The method of claim 4, further comprising:
providing a set of user interfaces for the user with the proper level of authority, the user interfaces adjustable for a level of complexity based on an identity of the user.

7. The method of claim 4, further comprising receiving the set of rules for analyzing historical data received by the intelligence engine.

8. The method of claim 7, further comprising:
correlating the historical data with current data to identify anomalies.

9. The method of claim 1, further comprising:
receiving additional data events not related to mobile communications, the data events selected from among: enterprise customer relationship management data, subscriber purchasing history, subscriber purchase preferences, subscriber purchase patterns, and subscriber wireless network usage.

10. A system comprising:
an interoperations system that enables roaming and accounting for the roaming, between a plurality of cellular network operators;
real-time intelligence system integrated into the interoperations system, to provide an enhanced platform, the real-time intelligence system comprising:

a database to store historical mobile communications network data, received passively from the plurality of cellular network operators, the network data events comprising one or more of: network signaling and usage records—including one or more Diameter, General Packet Radio Service (GPRS) protocol data including one or more of GTPu and GTP-C, Signaling System No. 7 protocol (SS7) data, RADIUS records, and data clearinghouse (DCH) data;

an event distributor to receive real-time data events from a plurality of sources including one or more of: subscriber profile data, subscriber billing data, and mobile device application data; and an intelligence engine to analyze the historical mobile communications network data stored in the database, wherein the intelligence engine is configured by a set of rules, wherein the intelligence engine determines an action in response to a real-time data event received by the event distributor based on the set of rules and the analysis of the historical mobile communication network data, the action directed at one or more of the plurality of cellular mobile network operators, a mobile subscriber to one of the plurality of cellular mobile network operators, and a corporate enterprise user.

11. The system of claim 10, wherein the system further comprises a data adaptor to collect and correlate real-time data events.

12. The system of claim 10, wherein the intelligence engine sends the determined action to an application program to perform the action.

13. The system of claim 10, wherein the intelligence engine receives application data from a plurality of application programs, wherein the intelligence engine determines the action in response to the real-time data event further based on the received application data.

14. The system of claim 10, wherein the action comprises a customer care communication, the customer care communication comprising one or more of: sending an offer to alter a mobile subscription plan to the mobile subscriber, sending a recommendation to the mobile subscriber, sending an alert regarding usage to the mobile subscriber, or sending an alert regarding network availability to the mobile subscriber.

15. The system of claim 10, further comprising:
a downloadable mobile application provided to the subscriber, the downloadable mobile application enabling communication between the subscriber and the mobile network operator to send real-time data events and collected user data to the event distributor.

16. A system comprising:
an interoperation provider enabling interoperation between a plurality of cellular mobile operators by enabling roaming and accounting for the roaming between the cellular mobile operators, the interoperation provider collecting data from the plurality of mobile operators;

a real-time intelligence system to receive data from the interoperation provider, the real-time intelligence system comprising:

a database to store historical mobile communications network data;

an event distributor to receive real-time data events from a plurality of sources; and an intelligence engine to analyze the real-time data events in view of the historical mobile communications network data stored in the database, wherein the intelligence engine is configured by a set of rules, wherein the intelligence engine determines an action in response to a real-time data event received by the event distributor based on the set of rules, and the analysis of the historical mobile communication network data and real-time data events and process responses, such as present an offer or collect an opt-in response.

17. The system of claim 16, further comprising:
a mobile application provided to a subscriber, the mobile application receiving data from the real-time intelligence system, enabling improved communication with the subscriber.

18. The system of claim 17, wherein the improved communication comprises one or more of: alerting the subscriber when usage is above a threshold, providing offers to alter the user's subscriber plan based on actual usage pattern to the user, providing usage recommendations to the subscriber, alerting the subscriber when network interruptions are detected, and enabling the subscriber to communicate with the mobile operator.

19. The system of claim 16, wherein the real-time intelligence system is configured to send an alert when the real-time data events indicate one or more of: a discrepancy from historical norms based on the historical mobile communication data, and meeting one or more rules.

20. The system of claim 19, wherein when the discrepancy indicates one or more of the following: a roaming disruption, a registration failure for a subscriber, a silent low spender, a connectivity error with a roaming partner, fraudulent messaging traffic originator, or an SIM cloning event,
the alert is sent to the mobile operator.

21. The system of claim 19, wherein when the discrepancy indicates one or more of the following: a subscriber using more services than supported by a data plan subscription, a subscriber using fewer services than supported by the data plan, a subscriber using only a portion of the data plan, and a subscriber using a feature that is not supported by the data plan.

* * * * *